United States Patent
Hosaka et al.

(10) Patent No.: US 12,286,101 B2
(45) Date of Patent: Apr. 29, 2025

(54) TRAVELING BODY WHICH DETECTS OBSTACLES AND GENERATES AN OBSTACLE MAP

(71) Applicants: Kento Hosaka, Kanagawa (JP); Koichi Kudo, Kanagawa (JP); Taku Kitahara, Tokyo (JP)

(72) Inventors: Kento Hosaka, Kanagawa (JP); Koichi Kudo, Kanagawa (JP); Taku Kitahara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 240 days.

(21) Appl. No.: 17/986,913

(22) Filed: Nov. 15, 2022

(65) Prior Publication Data

US 2023/0166728 A1 Jun. 1, 2023

(30) Foreign Application Priority Data

Nov. 30, 2021 (JP) .................................. 2021-194967
Mar. 18, 2022 (JP) .................................. 2022-044252

(Continued)

(51) Int. Cl.
*B60W 30/09* (2012.01)
*G01C 21/00* (2006.01)
(Continued)

(52) U.S. Cl.
CPC ......... *B60W 30/09* (2013.01); *G01C 21/3822* (2020.08); *G01S 17/89* (2013.01);
(Continued)

(58) Field of Classification Search
CPC ............ B60W 30/09; B60W 2552/35; B60W 2556/40; G01S 17/931; G01S 17/89; G01C 21/3822
See application file for complete search history.

(56) References Cited

U.S. PATENT DOCUMENTS 5,548,516 A 8/1996 Gudat et al.
9,395,192 B1 * 7/2016 Silver .................. G01S 13/865
(Continued)

FOREIGN PATENT DOCUMENTS

CN 110998471 A * 4/2020 ................ B60T 7/00
JP 2000-075032 3/2000
(Continued)

OTHER PUBLICATIONS

English translation of CN-110998471-A (Year: 2020).*
(Continued)

*Primary Examiner* — Alan D Hutchinson
*Assistant Examiner* — Matthew Ho
(74) *Attorney, Agent, or Firm* — XSENSUS LLP

(57) ABSTRACT

A traveling body includes a range sensor and circuitry. The range sensor is disposed on a front face of the traveling body in a traveling direction in which the traveling body travels on a road surface and disposed obliquely downward at an inclination angle relative to the road surface. The circuitry determines presence of a continuous obstacle in a case where measurement results of a plurality of planes scanned by the range sensor include a plurality of feature values indicating unevenness relative to the road surface similar to each other. The circuitry generates an obstacle map of a front region of the traveling body not scanned by the range sensor, based on sequential feature information indicating that a predetermined number of feature values indicating the unevenness are sequentially present; and controls the traveling body to travel on the road surface based on the obstacle map.

9 Claims, 21 Drawing Sheets

(30) Foreign Application Priority Data

Mar. 18, 2022 (JP) ................................ 2022-044421
May 31, 2022 (JP) ................................ 2022-088871
Oct. 20, 2022 (JP) ................................ 2022-168389
Oct. 20, 2022 (JP) ................................ 2022-168465

(51) Int. Cl.
*G01S 17/89* (2020.01)
*G01S 17/931* (2020.01)

(52) U.S. Cl.
CPC ........ *G01S 17/931* (2020.01); *B60W 2552/35* (2020.02); *B60W 2556/40* (2020.02)

(56) References Cited

U.S. PATENT DOCUMENTS

| | | | |
|---|---|---|---|
| 2008/0027591 A1 | 1/2008 | Lenser et al. | |
| 2009/0052742 A1* | 2/2009 | Okamoto | G06V 20/58 382/104 |
| 2015/0165972 A1* | 6/2015 | Takemae | G06V 20/58 348/148 |
| 2016/0011594 A1 | 1/2016 | Chung et al. | |
| 2018/0181127 A1* | 6/2018 | Choe | G01S 17/86 |
| 2018/0322640 A1 | 11/2018 | Kim et al. | |
| 2018/0334783 A1* | 11/2018 | Taylor | G01S 17/06 |

FOREIGN PATENT DOCUMENTS

| | | |
|---|---|---|
| JP | 2005-157689 | 6/2005 |
| JP | 2007-193495 | 8/2007 |
| JP | 2014-021625 | 2/2014 |
| JP | 2015-210734 | 11/2015 |
| JP | 2017-107563 | 6/2017 |
| JP | 2017-123194 | 7/2017 |
| JP | 2017-130225 | 7/2017 |
| JP | 2020159142 A * | 10/2020 |
| WO | WO-2022188185 A1 * | 9/2022 |

OTHER PUBLICATIONS

English translation of JP-2020159142-A (Year: 2020).*
English translation of WO-2022188185-A1 (Year: 2022).*
Partial European Search Report issued Feb. 22, 2023 in European Patent Application No. 22210076.0, 16 pages.
Pengpeng Sun, et al., "A 3D LiDAR Data-Based Dedicated Road Boundary Detection Algorithm for Autonomous Vehicles", IEEE Access, vol. 7, Feb. 28, 2019, 16 pages, XP011715637.
Office Action issued Mar. 4, 2024 in European Patent Application No. 22 210 076.0, 8 pages.
Extended European Search Report issued Mar. 29, 2023 in European Patent Application No. 22210076.0, 16 pages.

* cited by examiner

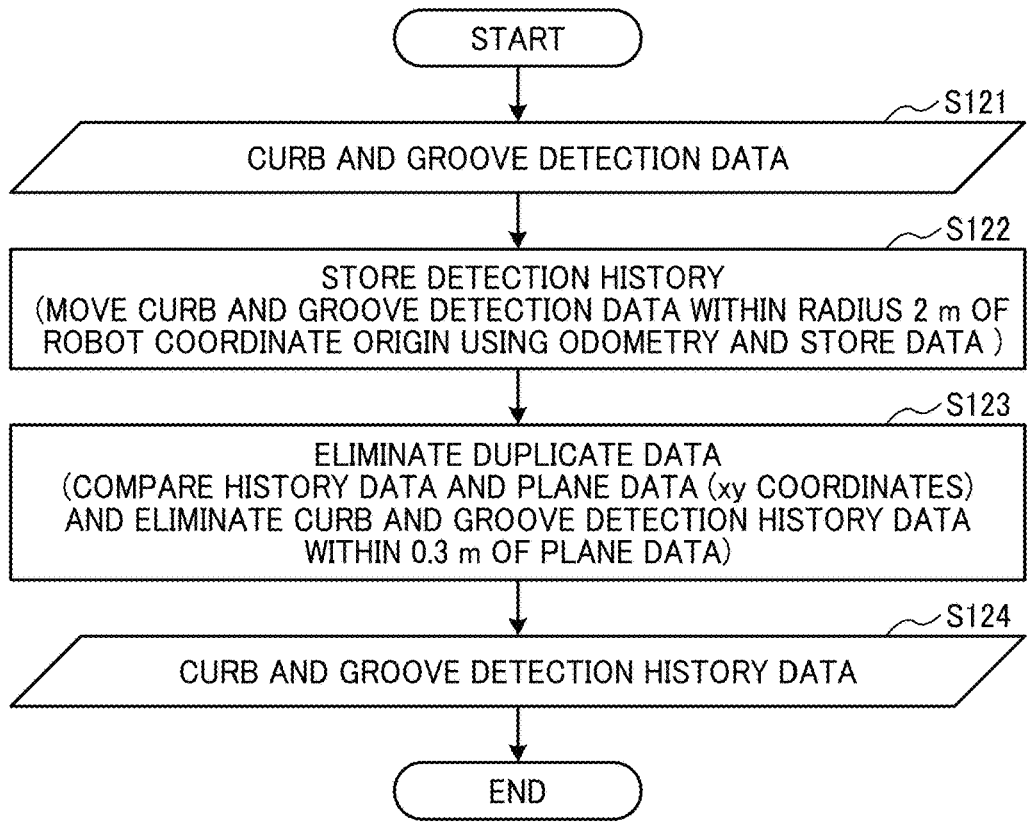
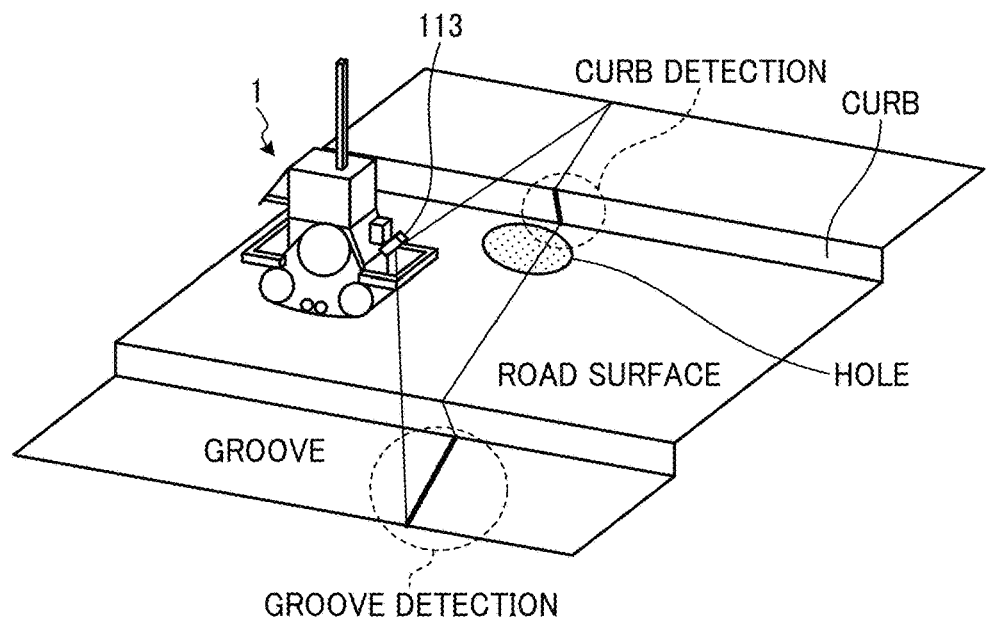

TRAVELING BODY WHICH DETECTS OBSTACLES AND GENERATES AN OBSTACLE MAP

CROSS-REFERENCE TO RELATED APPLICATIONS

This patent application is based on and claims priority pursuant to 35 U.S.C. § 119(a) to Japanese Patent Application Nos. 2021-194967 filed on Nov. 30, 2021, 2022-044252 filed on Mar. 18, 2022, 2022-044421 filed on Mar. 18, 2022, 2022-088871 filed on May 31, 2022, 2022-168389 filed on Oct. 20, 2022, and 2022-168465 filed on Oct. 20, 2022, in the Japan Patent Office, the entire disclosure of which is hereby incorporated by reference herein.

BACKGROUND

Technical Field

The present disclosure relates to a traveling body and a non-transitory recording medium.

Related Art

The presence of a leak or an abnormality of a structure installed outdoors such as a chemical plant is generally visually inspected by an inspector. Examples of such a structure include pipes, meters, and valves. Technologies using an autonomous traveling body have been developed for performing the above-described inspection work unattended.

In a related technology, a ranging device performs one-dimensional laser scanning K times, and an obstacle having a recessed shape is detected in a case where a recessed portion is detected sequentially in the scans from (K-a)th scan to the K-th scan.

SUMMARY

One aspect concerns a traveling body that includes a range sensor and circuitry. The range sensor is disposed on a front face of the traveling body in a traveling direction in which the traveling body travels on a road surface and disposed obliquely downward at an inclination angle relative to the road surface. The circuitry determines presence of a continuous obstacle in a case where measurement results of a plurality of planes scanned by the range sensor include a plurality of feature values indicating unevenness relative to the road surface similar to each other. The circuitry generates an obstacle map of a front region of the traveling body not scanned by the range sensor, based on sequential feature information indicating that a predetermined number of feature values indicating the unevenness are sequentially present; and controls the traveling body to travel on the road surface based on the obstacle map.

Another aspect concerns a non-transitory recording medium storing a plurality of program codes which, when executed by one or more processors, causes the processors to perform a method for controlling a traveling body to travel on a road surface. The method includes determining presence of a continuous obstacle in a case where measurement results of a plurality of planes scanned by a range sensor include a plurality of feature values indicating unevenness relative to the road surface similar to each other. The range sensor is disposed on a front face of the traveling body in a traveling direction in which the traveling body travels and disposed obliquely downward at an inclination angle relative to the road surface. The method further includes generating an obstacle map of a front region of the traveling body not scanned by the range sensor, based on sequential feature information indicating that a predetermined number of feature values indicating the unevenness are sequentially present; and controlling the traveling body to travel on the road surface based on the obstacle map.

In another aspect, a traveling body includes a driver configured to travel on a road surface, a range sensor disposed on a front face of the traveling body in a traveling direction tri which the traveling body travels, and circuitry. The range sensor is disposed obliquely downward at an inclination angle of 35 degrees or greater relative to the road surface and is disposed at such a height that the range sensor detects 1 meter or more ahead from a front end of the driver in the traveling direction. The circuitry determines whether an obstacle is present on the road surface based on a measurement result obtained by the range sensor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 21 is a flowchart illustrating an example of a procedure of generating and storing curb/groove detection history data, performed by the traveling device according to one embodiment;

FIGS. 22A and 22B are diagrams illustrating an example in which the traveling device changes the traveling direction with reference to past scan results, according to one embodiment;

Figure 1C:
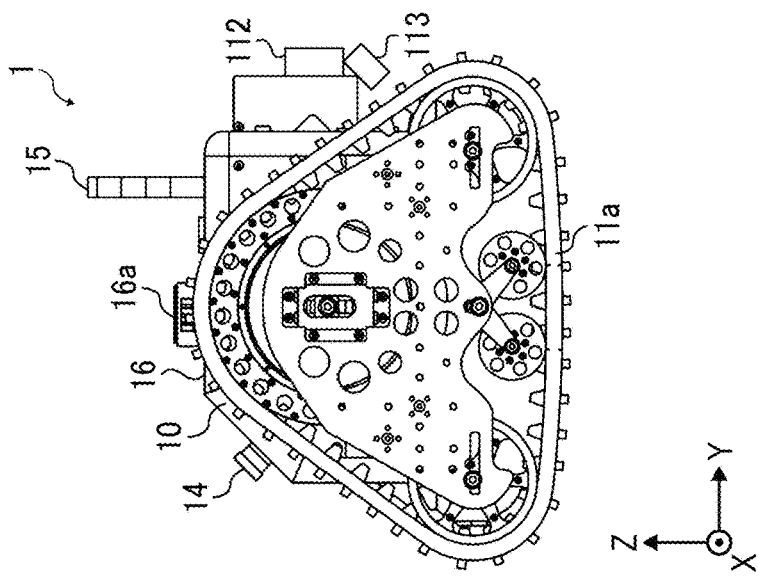
FIGS. 1A, 1B, and 1C are views of an example of a traveling device according to one embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Some embodiments of the present disclosure are described below with reference to the drawings.

Configuration of Traveling Device

Figure 1B:
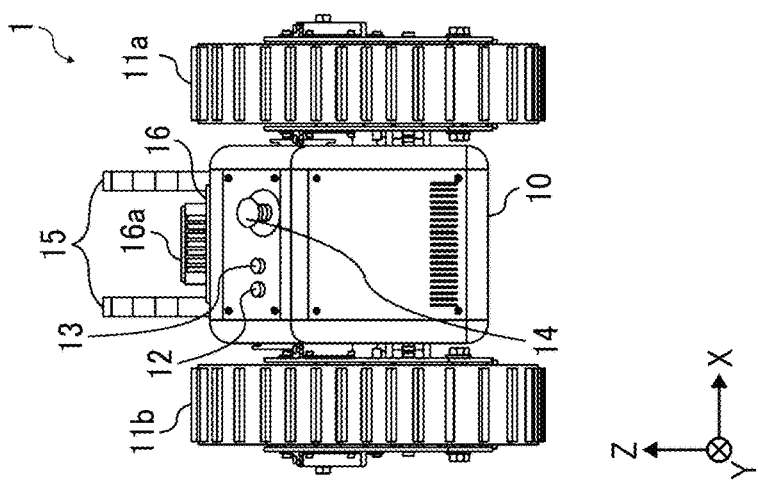
Figure 1A:
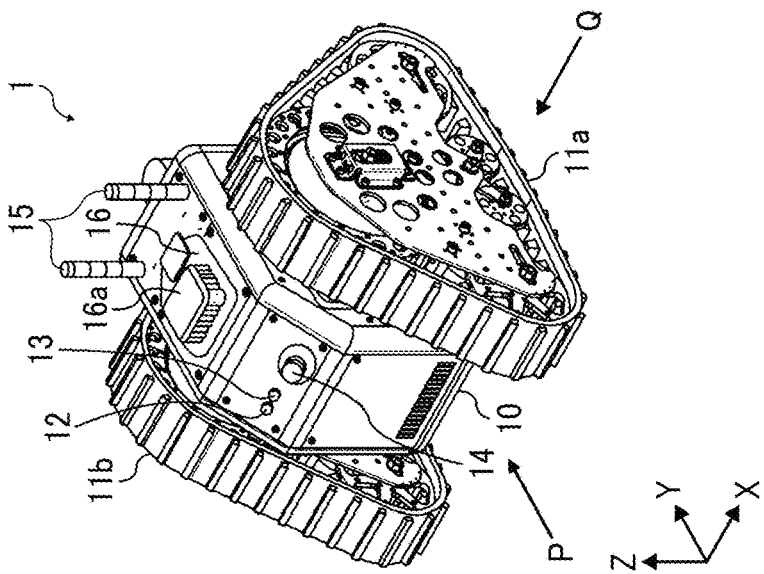

FIGS. 1A to 1C are views of an example of a traveling device 1 according to the present embodiment.

FIG. 1A is a perspective view of an outer appearance of the traveling device 1 according to the present embodiment. FIG. 1B is a front view of the traveling device 1 according to the present embodiment as seen in the direction indicated by arrow P in FIG. 1A. FIG. 1C is a side view of the traveling device 1 according to the present embodiment as seen in the direction indicated by arrow Q in FIG. 1A.

In the present specification, the x direction matches a lateral width direction of the traveling device 1. Further, the y-direction matches a traveling direction of the traveling device 1, and the z-direction matches a height direction of the traveling device 1. The coordinates represented by x, y, and z may be referred to as robot coordinates. That is, the robot coordinates are coordinates centered on the traveling device 1.

The traveling device 1 as a traveling body includes crawler traveling bodies 11a and 11b and a main body 10.

The crawler traveling bodies 11a and 11b are units serving as traveling means for the traveling device 1. Each of the crawler traveling bodies 11a and 11b is a crawler traveling body using a metallic or rubber belt.

Compared with a traveling body that travels with tires, such as an automobile, the crawler traveling body has a wider contact area with the ground, so that the travel is more stable even in an environment with bad footing, for example. While the traveling body that travels with the tires requires space to make a turn, the traveling device with the crawler traveling body can perform a so-called super pivot turn, so that the traveling device can smoothly turn even in a limited space.

In this disclosure, a pivot turn refers to turning on the spot with the center of the vehicle body as an axis by rotating the left and right crawler belts in opposite directions at a constant speed. Such a turn is also called a spin turn or the like.

The two crawler traveling bodies 11a and 11b are installed so that the traveling device 1 can travel with the main body 10 interposed therebetween. The number of crawler traveling bodies is not limited to two and may be three or more. For example, the traveling device 1 may include three crawler traveling bodies arranged in parallel so that the traveling device 1 can travel. Alternatively, for example, the traveling device 1 may include four crawler traveling bodies arranged on the front, rear, right, and left sides like the tires of an automobile.

The crawler traveling bodies 11a and 11b (also collectively "crawler traveling bodies 11") each have a triangular shape. The triangular crawler traveling bodies 11 are advantageous in that, when a constraint is imposed on the length of the traveling body in the front-rear direction, the contact area of the crawler traveling body with the ground is maximized within the constraint. This can improve the stability in traveling as described above. In case of a so-called tank crawler having an upper side (driving wheel side) longer than a lower side (rolling wheel side), when a constraint is imposed on the front-rear direction length, the contact area with the ground is generally small, making traveling unstable. As described above, the crawler traveling bodies 11 is effective in improving traveling performance, especially when applied to the traveling device 1 that is relatively small.

The main body 10 supports the crawler traveling bodies 11a and 11b to be able to travel and functions as a controller that controls the driving of the traveling device 1. In addition, the main body 10 includes a battery to supply electric power for driving the crawler traveling bodies 11a and 11b.

The main body 10 of the traveling device 1 includes a power button 12, a start button 13, an emergency stop button 14, state indicator lamps 15, and a lid 16.

The power button 12 is an operation device to be pressed by a person around the traveling device 1 to turn on or off the power of the traveling device 1. The start button 13 is an operation device to be pressed by a person around the traveling device 1 to start the two crawler traveling bodies 11a and 11b. The emergency stop button 14 is an operation device to be pressed by a person around the traveling device 1 to stop the traveling device 1 being traveling.

The state indicator lamps 15 are examples of a notification device to indicate a state of the traveling device 1. For example, when the state of the traveling device 1 changes due to a decrease in the remaining battery level, the state indicator lamps 15 light up to notify a person nearby of the state change of the traveling device 1. In addition, the state indicator lamps 15 are turned on in a case of a risk of an abnormality, for example, in a case where an obstacle that obstructs the traveling of the traveling device 1 is detected.

Although the traveling device 1 in FIGS. 1A to 1C includes the two state indicator lamps 15, the number of state indicator lamps 15 is not limited thereto and may be one or three or more. In alternative to the state indicator lamps 15, the notification device may use, for example, a speaker to output an alert sound indicating a state of the traveling device 1.

The lid 16 is disposed on an upper face of the main body 10 and seals the inside of the main body 10. The lid 16 has a ventilation part 16a, having an air vent through which air flows from or to the inside of the main body 10.

The traveling device 1 includes a range sensor 112 on a front face of the main body 10 in the traveling direction. The range sensor 112 is for horizontal direction detection. The range sensor 112 for horizontal-direction detection is a two-dimensional light detection and ranging (2D LIDAR) sensor that performs detection by light and range finding in a two-dimensional direction. There are range sensors employing micro-electro-mechanical systems (MEMS) and range sensors employing a rotary mirror.

The range sensor 112 irradiates an object with laser light, measures the time for the laser light to be reflected back from the object, and calculates the distance to the object and the direction in which the object exists based on the measured time.

The traveling device 1 further includes a range sensor 113 on the front face of the main body 10 in the traveling direction. The range sensor 113 is for oblique direction detection. The range sensor 113 for oblique direction detection is also a 2D LIDAR sensor capable of range finding in a two-dimensional direction. The range sensor 113 may employ MEMS or a rotary mirror. The range sensor 113 is installed at an angle inclined down from the horizontal surface so as to be inclined down at a predetermined inclination angle relative to a horizontal road surface on which the traveling device 1 travels.

The range sensor 113 irradiates an object, such as an obstacle on the road surface, with laser light, measures the time for the laser light to be reflected back from the object, and calculates the distance to the object and the direction in which the object exists based on the measured time.

For the installation position of the range sensor 113, an appropriate value depends on the widths and lengths of the crawlers of the crawler traveling bodies 11a and 11b and the sizes, widths, depths, and heights of objects to be detected.

Figure 2A:
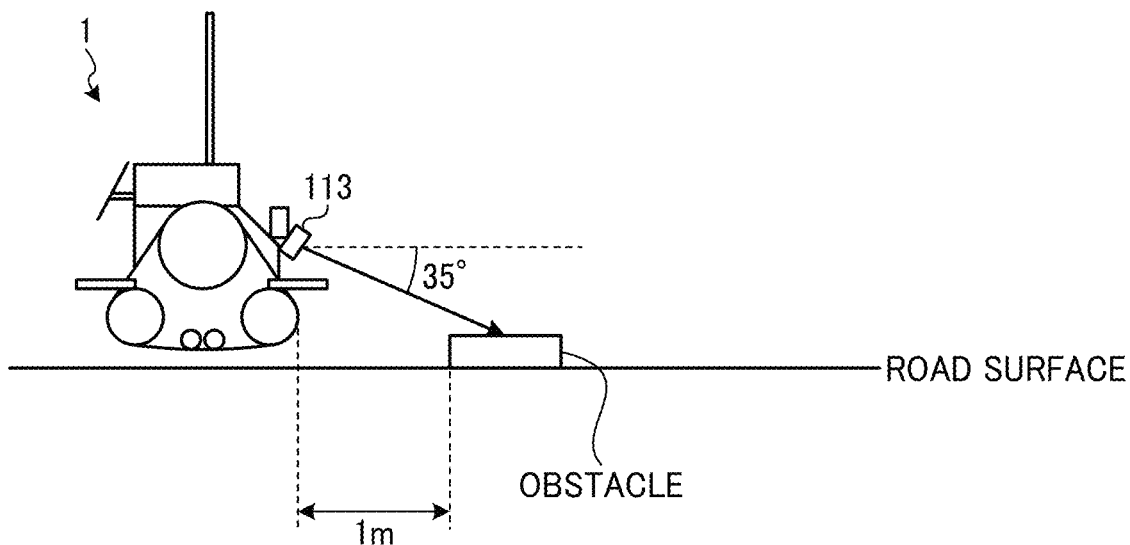
FIGS. 2A and 2B are diagrams illustrating an example of a position of a range sensor in the traveling device according to one embodiment.
Figure 2B:
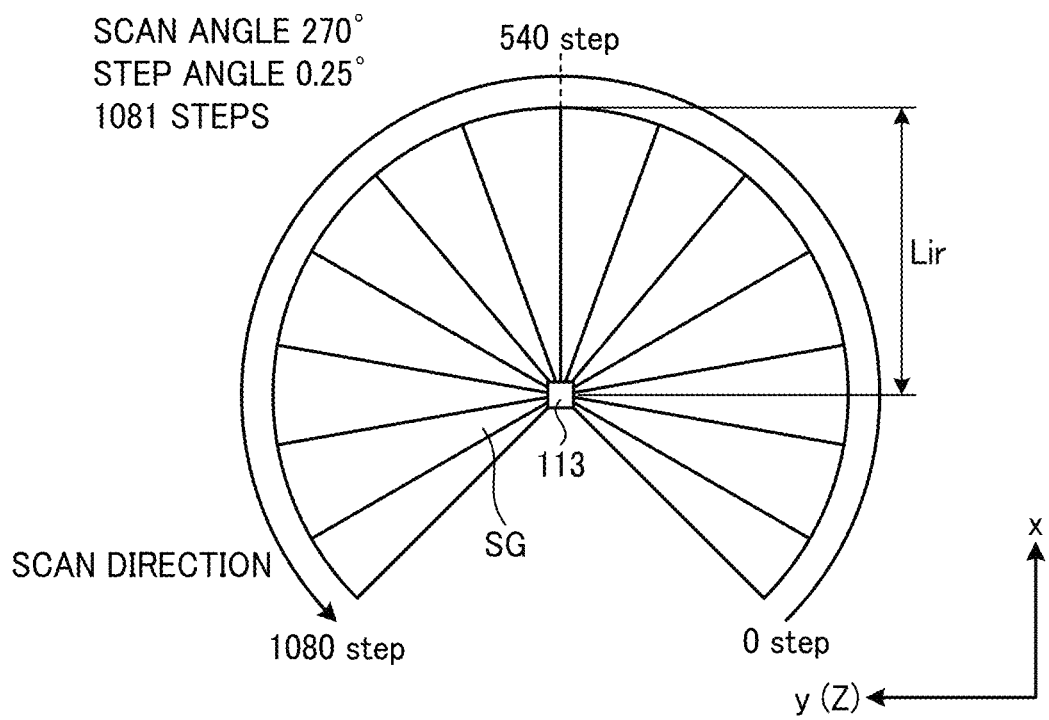

FIGS. 2A and 2B are diagrams illustrating an installation example of the range sensor 113 of the traveling device 1 according to the present embodiment. FIG. 2A is a diagram illustrating an example of an installation angle and an installation height of the range sensor 113. FIG. 2B is a diagram illustrating an example of a laser irradiation range of the range sensor 113.

As illustrated in FIG. 2A, the range sensor 113 is installed such that the irradiation angle to the road surface is 35 degrees or greater relative to the road surface, for example. Further, the range sensor 113 is installed at such a height that the range sensor 113 detects 1 m or more ahead in the traveling direction from the front end of the crawler traveling bodies 11a and 11b traveling on the road surface. The crawler traveling bodies 11a and 11b are drivers (driving wheels).

The range sensor 113 can perform laser irradiation in a predetermined range including the x direction in front of the range sensor 113. FIG. 2B is a cross-sectional view taken along the x-y plane or the x-z plane in such a laser irradiation range.

As illustrated in FIG. 2B, the laser irradiation range of the range sensor 113 is set to, for example, a range of 270 degrees around the x direction in front of the range sensor 113. Specifically, the range sensor 113 can irradiate a range SG extending from −45 degrees to +45 degrees (including −45 degrees and +45 degrees) with the x direction as 90 degrees. That is, the range SG has the angle range of 180 degrees plus 45 degrees in each of minus direction and plus direction.

Note that the above-described irradiation angle of the range sensor 113 to the road surface is an irradiation angle of the laser emitted at a right angle to the irradiation plane of the range sensor 113. In other words, the range sensor 113 is faced obliquely downward such that the irradiation plane has an inclination angle of 35 degrees or greater relative to the road surface.

The range sensor 113 can be set to perform laser irradiation, for example, with a step angle of 0.25 degree in the irradiation range of 270 degrees. In other words, the range sensor 113 can emit a laser beam with a resolution of dividing the range of 270 degrees in 1080 steps.

The range sensor 113 has a laser irradiation distance Lir that is set to, for example, not smaller than 10 m and not greater than 20 m.

For example, when the traveling device 1 is traveling at a high speed, there is a demand for observing a farther distance, and when the traveling device 1 is turning, there is a demand for observing an area near the foot. Therefore, the laser irradiation angle of the range sensor 113 may be optimized in accordance with, for example, the traveling speed of the traveling device 1 or the size of a detected object such as an obstacle on a road surface.

For example, the range sensor 113 is a three-dimensional (3D) LIDAR capable of range finding in three-dimensional directions. Examples of the 3D LIDAR include a LIDAR that emits a plurality of laser beams in a direction orthogonal to a scanning direction of the laser beam so as to simultaneously acquire distance-measuring data at a plurality of irradiation angles, and a LIDAR that performs scanning with a laser beam in a three-dimensional direction using, for example, a MEMS mirror to acquire three-dimensional data. Since a 3D LIDAR acquires three-dimensional data at a time, a vibration of the robot or shakes in the tilt direction less adversely affects the detection of the road surface, compared with a 2D LIDAR.

As for the installation position of the 3D LIDAR, since the road surface position to be observed does not change, the 3D LIDAR is preferably installed under conditions similar to those of the 2D LIDAR. To acquire information on the road surface 1 m or more ahead in the forward direction, the 3D LIDAR is disposed to emit the laser beam 1 m or more ahead in front of the traveling device 1. Further, regarding the laser beam irradiation position at the vertical angle (tilt direction) relative to the traveling direction, the 3D LIDAR is disposed such that the road surface 1 m ahead is irradiated with the laser beam at an angle of 35 degrees or greater.

Since the traveling device 1 includes the crawler traveling bodies 11*a* and 11*b* illustrated in FIG. 1 as described above, the traveling device 1 can stably travel even on rough ground having unevenness.

However, in the crawler traveling bodies 11*a* and 11*b*, a part of the crawler belt is not grounded and floats due to unevenness of the rough ground. Then, the height position detected by the range sensor changes as the main body 10 traveling on rough ground shakes back and forth.

In addition, vibration in traveling may cause a malfunction of the range sensor. For example, a mirror polarization sensor such as a MEMS sensor is weak against vibration and may stop due to vibration.

Therefore, in the present embodiment, the traveling device 1 includes an inertial measurement unit (IMU) in the main body 10. The IMU is a tilt sensor that detects a tilt amount of the traveling device 1. Details of the IMU are to be described later.

Further, the range sensor 113 may be mounted on a shock absorbing structure supported by a spring, rubber, or the like. The IMU may also be mounted on a shock absorbing structure. This structure reduces shaking of the range sensor 113, and thus reduces malfunction due to vibration in traveling of the traveling device 1.

When the shock absorbing structure is an active steering mechanism, the range sensor 113 can be kept horizontal. The range sensor 113 may be disposed in the main body 10 via an arm.

As described above, as the irradiation angle of the range sensor 113 relative to the road surface becomes closer to a right angle, the resolution in the x direction, which is the traveling direction of the traveling device 1, increases. Accordingly, the detection accuracy can be improved. Therefore, it is preferable to dispose the range sensor 113 such that the irradiation angle is as deep as possible.

On the other hand, when the range sensor 113 is disposed as described above, the laser irradiation distance in the x direction in which the traveling device 1 travels becomes short. Then, the detection distance in the traveling direction of the traveling device 1 becomes short, that is, detecting a far area is not available.

When the laser irradiation angle of the range sensor 113 relative to the road surface is shallow, the far area can be detected, but the influence of fluctuations and variations due to the vibration of the traveling device 1 increases. In addition, in a case of shallow irradiation angle, when the vehicle travels on a downhill, the road surface may not be irradiated with the light.

In view of this, the range sensor 113 is disposed at a high position to detect a far area even at the same irradiation angle. In this manner, both the irradiation angle and the installation height of the range sensor 113 are adjusted to appropriate values.

Figure 3A:
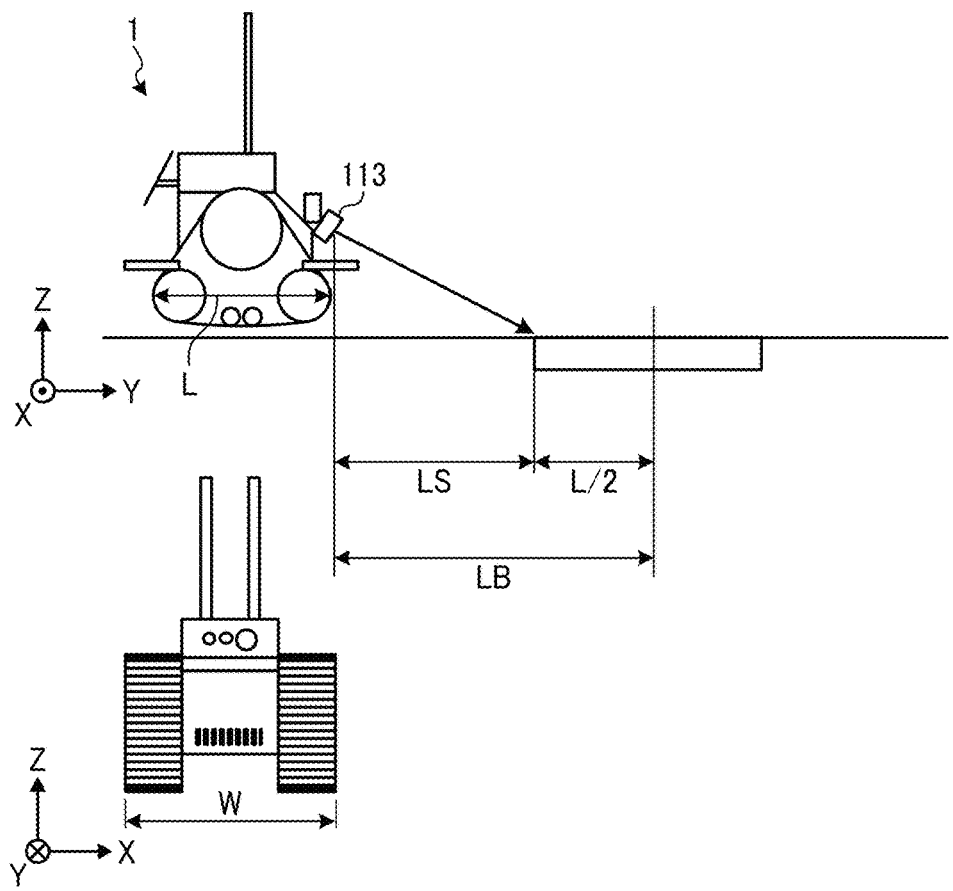
FIGS. 3A and 3B are diagrams illustrating a basis for setting the position of the range sensor of the traveling device according to one embodiment.
Figure 3B:
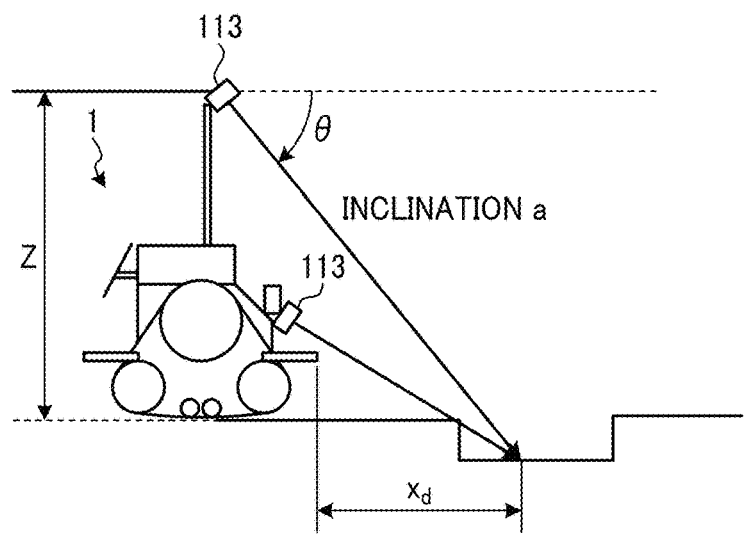

With reference to FIGS. 3A and 3B, a detailed description will be given of the basis for setting the irradiation angle of the range sensor 113 to the road surface to 35 degrees or greater relative to the horizontal direction as described above and setting the height position of the range sensor 113 so as to enable detection of 1 m or more ahead of the front end of the crawler traveling bodies 11*a* and 11*b* in the traveling direction.

FIGS. 3A and 3B are diagrams illustrating the basis for setting the installation position of the range sensor 113 of the traveling device 1 according to the present embodiment. FIG. 3A is a diagram illustrating the basis for the irradiation distance of the range sensor 113. FIG. 3B is a diagram illustrating the basis for setting the irradiation angle and the height position of the range sensor 113.

The irradiation angle of the range sensor 113 is preferably optimized based on, for example, the speed of the traveling device 1 and the size of an object to be detected.

As illustrated in FIG. 3A, when the crawler traveling body 11 of the traveling device 1 has a ground contact length L and a width W, there is almost no possibility that the crawler traveling body 11 falls in a hole having a length L/2 or smaller or a width W/2 or smaller. When the traveling device 1 has a braking distance LB and the range sensor 113 has a detection distance LS, for the traveling device 1 to stop without coming into contact with or falling into the obstacle in front of the traveling device 1, at least a relation: LS>LB−L/2 is satisfied, and, more preferably, a relation: LS>LB is satisfied. In other words, the detection distance LS is longer than at least a value obtained by subtracting ½ of the ground contact length L from the braking distance LB.

As described above, the traveling device 1 can safely stop when the detection distance LS of the range sensor 113 is set to be greater than the braking distance LB (LS>LB). For example, when the braking distance LB of the traveling device 1 is 0.60 m, the detection distance LS with which the traveling device 1 can safely stop is, for example, 1 m.

FIG. 3B illustrates an installation height z at which the range sensor 113 is installed. Two examples of z=0.4125 m and z=0.97 m are assumed in view of the layout of the traveling device 1. At this time, an irradiation angle θ of the range sensor 113 is adjusted to obtain a detection distance $x_d$ of 1 m from an end of a bumper protruding most in the traveling device 1 in the traveling direction.

When the installation height z is 0.4125 m, an installation angle of the range sensor 113, in other words, the irradiation angle θ relative to the road surface is 20 degrees. Then, an inclination a of the irradiation angle θ is tan θ=tan 20=0.36.

When the installation height z is 0.97 m, the installation angle of the range sensor 113, in other words, the irradiation angle θ relative to the road surface is 35 degrees. Then, the inclination a of the irradiation angle θ is tan θ=tan 36=0.70.

When there is minute unevenness on the road surface, the detection distance of the range sensor 113 varies by the reciprocal of the inclination a at the individual installation height z. Then, the detection accuracy decreases. For this reason, the installation height z of 0.97 m which can provide a deep irradiation angle of 35 degrees is adopted.

As described above, as an appropriate value of the irradiation angle of the range sensor 113 to the road surface, the set value of 35 degrees or greater relative to the horizontal direction is adopted. Further, the set value of 1 m or greater is adopted as an appropriate value of the detection distance of the range sensor 113 from the front end of the crawler traveling bodies 11*a* and 11*b* in the traveling direction. Further, the set value of 0.97 m is adopted as an appropriate value of the installation height of the range sensor 113 for the range sensor 113 to detect 1 m or greater from the front end of the crawler traveling bodies 11*a* and 11*b* in the traveling direction. Note that, although the height examples are given as calculation examples above, the range sensor 113 may be installed, for example, at a height of 0.5 m or more from the road surface.

In related technologies in which the details of the irradiation angle and the installation height of a ranging device are not considered in view of the detection distance of the ranging device, the ranging device may fail to output an appropriate detection result. Then, it becomes difficult to make the traveling body travel safely.

Even when the range sensor 113 is a 3D LIDAR, the above-described concept of installation design does not change. In the case of a beam irradiation angle of 35 degrees or smaller, detecting a step is difficult. Accordingly, the 3D LIDAR is installed at such an angle that enables beam irradiation at 35 degrees or smaller and such a height that enables detection of 1 m ahead from the front end. In addition, in a case where the range sensor 113 is a MEMS-scan 3D LIDAR having a conical beam irradiation range, the detection range becomes narrower as the distance from the center increases. Therefore, in the case where the range sensor 113 is a 3D LIDAR, the range sensor 113 is desirably installed such that the center of the beam has the irradiation angle of 35 degrees and detects 1 m ahead.

Hardware Configuration of Traveling Device

Figure 4:
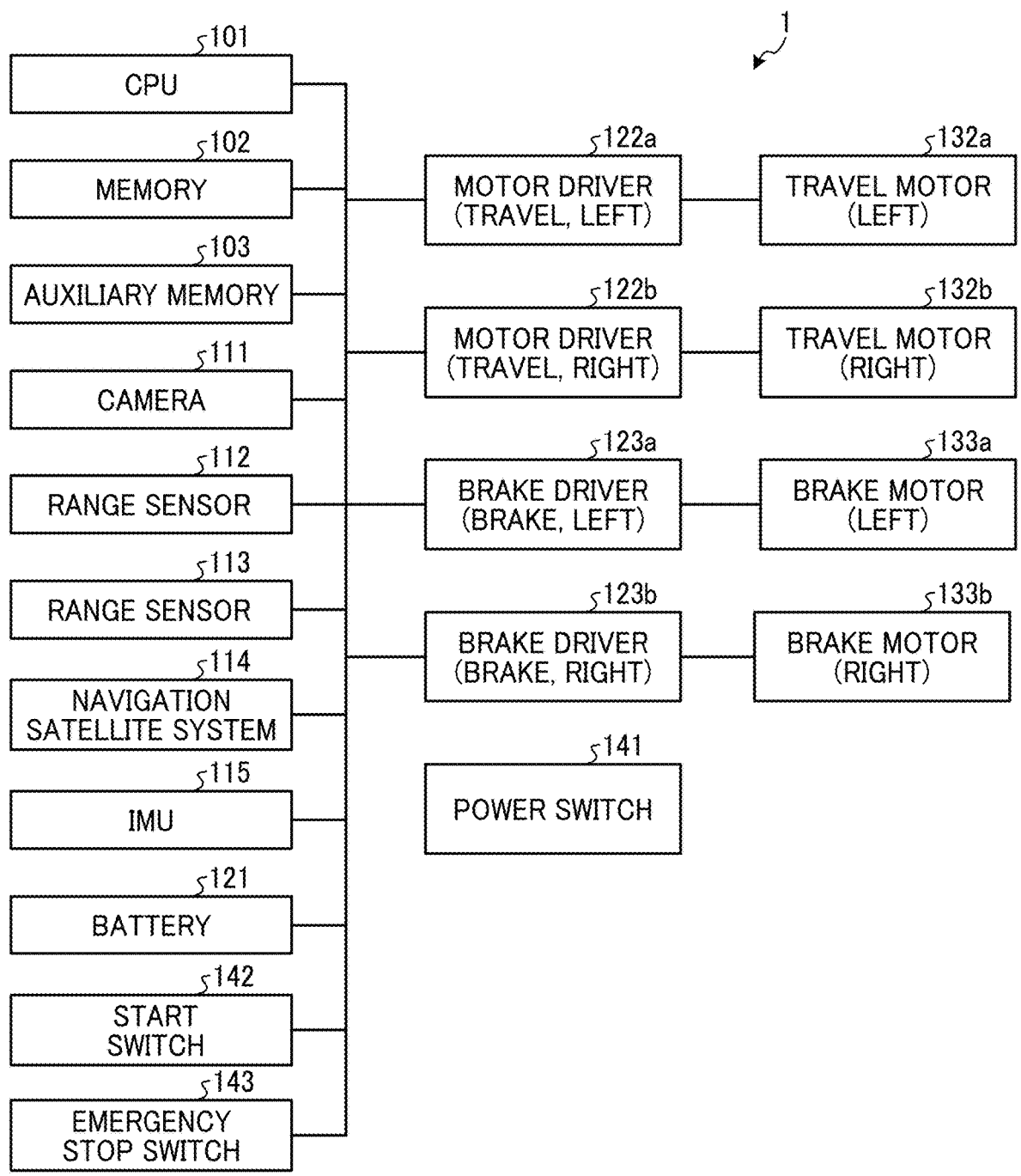
FIG. 4 is a block diagram illustrating a hardware configuration of the traveling device according to one embodiment.

Referring to FIG. 4, an example of a hardware configuration of the traveling device 1 according to the present embodiment is described. FIG. 4 is a block diagram illustrating a hardware configuration of the traveling device 1 according to the present embodiment.

As illustrated in FIG. 4, the traveling device 1 includes a central processing unit (CPU) 101, a memory 102, an auxiliary memory 103, a camera 111, range sensors 112 and 113, a navigation satellite system 114, an IMU 115, a battery 121, motor drivers 122*a* and 122*b* (left and right), travel motors 132*a* and 132*b* (left and right), brake drivers 123*a* and 123*b* (left and right), brake motors 133*a* and 133*b* (left and right), a power switch 141, a start switch 142, and an emergency stop switch 143.

The CPU 101 controls the entire operation of the traveling device 1. The CPU 101 operates according to a travel program stored in the memory 102, so as to function as a determination unit and a map generation unit to generate an obstacle map. The CPU 101 operates according to a travel program stored in the memory 102, so as to travel using the obstacle map generated by the map generation unit. The memory 102 is a temporary storage area for the CPU 101 to execute such as a program for controlling travel. The auxiliary memory 103 stores the travel program and the like executed by the CPU 101.

The travel program to be executed on the traveling device 1 may be recorded, as a file installable or executable by a computer, on a computer-readable recording medium, such as a compact disc-read only memory (CD-ROM), a flexible disk (FD), a compact disc-recordable (CD-R), or a digital versatile disk (DVD) and provided.

The travel program to be executed on the traveling device 1 may be stored on a computer connected to a network, such as the Internet, to be downloaded from the computer via the network. Alternatively, the travel program executed on the traveling device 1 may be provided or distributed via a network such as the Internet. Further, the travel program executed on the traveling device 1 may be provided as being preloaded in, for example, a ROM of the traveling device 1.

The motor drivers 122*a* and 122*b* (collectively "motor drivers 122") are drivers for the travel motors 132*a* and 132*b* (collectively "travel motors 132") provided in the two crawler traveling bodies 11*a* and 11*b*, respectively. The brake drivers 123*a* and 123*b* (collectively "brake drivers 123") are drivers for the brake motors 133*a* and 133*b* (collectively "brake motors 133") provided in the two crawler traveling bodies 11*a* and 11*b*, respectively. The motor drivers 122 and the brake drivers 123 receive commands from the CPU 101 to control the travel motors 132 and the brake motors 133, respectively.

The power switch 141 is a switch that turns on or off the power of the traveling device 1. The power switch 141 operates in conjunction with the pressing of the power button 12 (see FIG. 1) described above. The start switch 142 is a switch for starting the crawler traveling bodies 11*a* and 11*b*. The start switch 142 operates in conjunction with the pressing of the above-described start button 13 (see FIG. 1A). The emergency stop switch 143 is a switch for stopping the crawler traveling bodies 11*a* and 11*b* in case of emergency. The emergency stop switch 143 operates in conjunction with pressing of the above-described emergency stop button 14 (see FIG. 1A).

Examples of the camera 111 include a spherical camera, a stereo camera, and an infrared camera. As described above, the range sensor 112 is a LIDAR sensor for horizontal direction detection. As described above, the range sensor 113 is a LIDAR sensor for oblique direction detection.

The navigation satellite system 114 receives radio waves from a satellite and measures the position of the traveling device 1 on the earth based on the received result. The navigation satellite system 114 uses a Real Time Kinematic (RTK)-Global Navigation Satellite System (GNSS). In the position determination (localization) by the RTK-GNSS, when a high-accuracy positioning solution (Fix solution) in the RTK-GNSS positioning is obtained, an accuracy in several centimeters can be obtained.

The navigation satellite system 114 includes two antennas for GNSS reception. The navigation satellite system 114 determines that the reliability (accuracy) of the position information is low when there is a difference of a certain distance or more between the position information obtained by the two antennas.

The IMU 115 includes a triaxial accelerometer sensor and a rotational angular velocity sensor. The traveling device 1 detects the tilt amount of the main body 10 of the traveling device 1 by using the measurement data of the IMU 115, and corrects the height difference relative to the road surface measured by the range sensor 113, based on the tilt amount of the traveling device 1.

The IMU 115 is preferably disposed in the vicinity of the range sensor 113. When the range sensor 113 is provided on the main body 10 via an arm, the IMU 115 is preferably provided on the arm. In the present embodiment, the IMU 115 also serves as an IMU for self-localization for determining the posture of the traveling device 1.

This configuration can eliminate the inconvenience that the height position detected by the range sensor 113 changes as the main body 10 traveling on the rough ground shakes back and forth.

The CPU 101 functioning as the determination unit determines the presence of a continuous obstacle in a case where the result of one time measurement output by the range sensor 113 includes a feature value indicating unevenness relative to the road surface, and substantially the same unevenness is measured at substantially the same position in the results of a plurality of measurement results (N times) by the range sensor 113. In other words, in a case where the measurement results include feature values indicating similar unevenness, the similar unevenness is determined as a continuous obstacle.

Note that when the distance measuring sensor 113 is a 3D LIDAR, detection results of a plurality of scan planes can be obtained in one scan. In a case where measurement results of a plurality of planes scanned by the range sensor 113 include a plurality of feature values indicating unevenness relative to the road surface, similar to each other, the CPU 101 determines that the unevenness is a continuous obstacle.

In addition, when a predetermined number of feature values indicating unevenness are sequentially detected within a predetermined radius, the CPU 101 functioning as the map generation unit performs curve-fitting prediction based on sequential information indicating that the predetermined number of feature values indicating unevenness are sequentially detected, so as to generate an obstacle map of a front region of the traveling body, not scanned by the range sensor 113 for oblique direction detection.

Next, an operation related to autonomous traveling of the traveling device 1 will be described.

Figure 5:
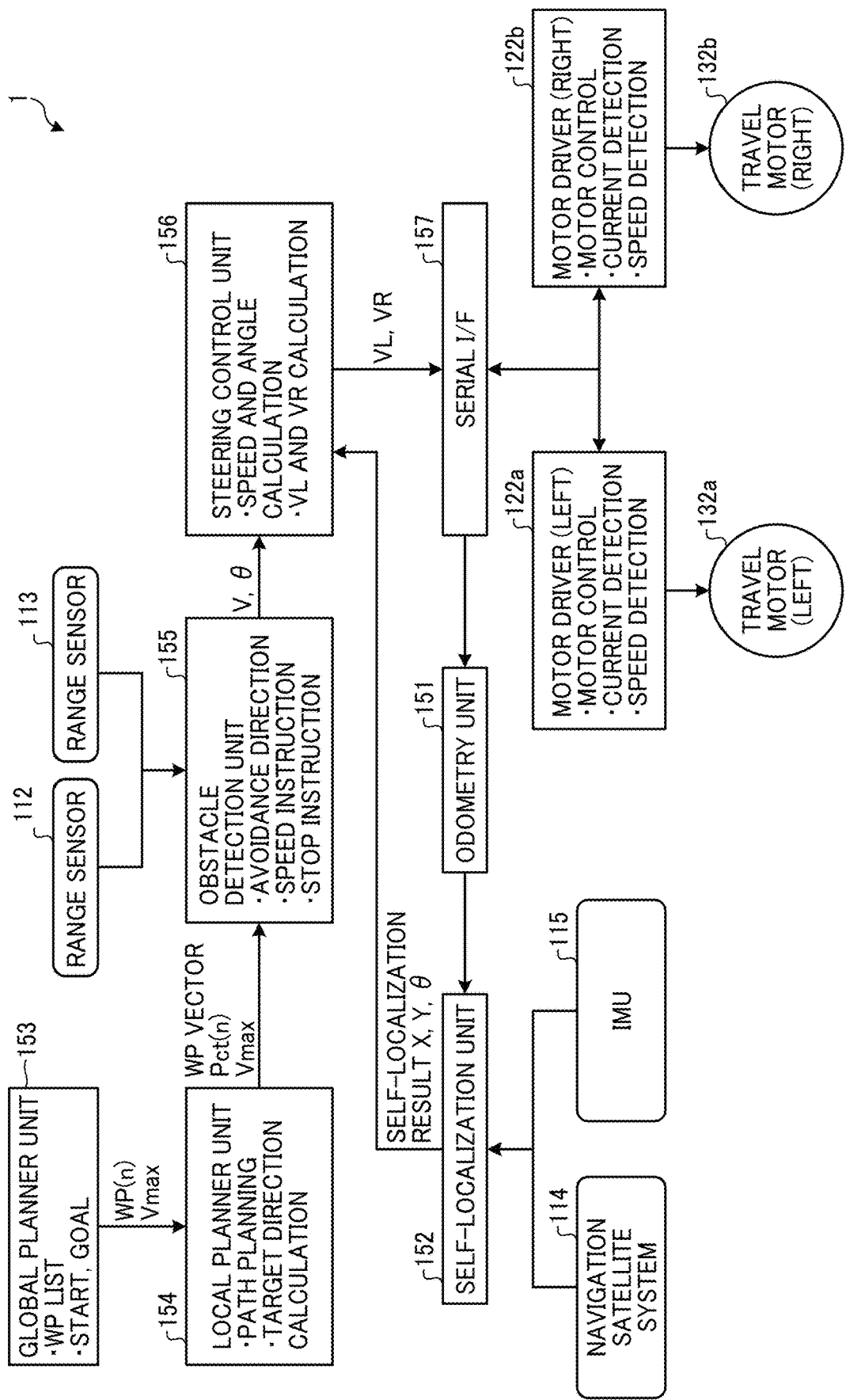
FIG. 5 is a block diagram illustrating a functional configuration related to autonomous traveling of the traveling device according to one embodiment.

FIG. 5 is a block diagram illustrating an example of a functional configuration related to autonomous traveling of the traveling device 1. As illustrated in FIG. 5, the autonomous traveling of the traveling device 1 involves a function related to self-localization of the traveling device 1 using the navigation satellite system 114 and a function related to traveling control of the traveling device 1.

First, self-localization of the traveling device 1 will be described.

As illustrated in FIG. 5, the traveling device 1 includes an odometry unit 151 and a self-localization unit 152 as functions related to self-localization of the traveling device 1.

Regarding the self-localization of the traveling device 1, as described above, high-accuracy position information using the navigation satellite system 114 is used. However, the position update cycle is about 200 milliseconds to 1 second and has large variations. Therefore, the odometry unit 151 performs odometry calculation for determining the self-position of the traveling device 1 from rotation angles w of the travel motors 132*a* and 132*b* that drive the two crawler traveling bodies 11*a* and 11*b*, respectively. The rotation angles ω of the travel motors 132*a* and 132*b* can be obtained from a hall sensor pulse for driving the travel motors 132*a* and 132*b* or an external sensor such as an encoder or a tachometer.

The self-localization unit 152 outputs a self-localization result (X,Y,θ). The self-localization unit 152 corrects the odometry information calculated by the odometry unit 151, thereby performing stable self-localization. More specifically, the self-localization unit 152 corrects the odometry information using the position information obtained by the navigation satellite system 114 (including the RTK-GNSS) and a posture change measured by the IMU 115.

Incidentally, the position information by the RTK-GNSS may be suddenly shifted by several tens of centimeters to several meters due to the influence of, for example, a reflecting object. Therefore, when a difference between the respective position information acquired by the two antennas described above is not equal to or greater than a certain amount, the self-localization unit 152 corrects the above-described odometry information calculated by the odometry unit 151, so as to prevent an unstable operation due to such a sudden shift in the self-localization. On the other hand, when the difference between the respective position information acquired by the two antennas described above the certain amount or greater, or when the high-accuracy positioning solution (Fix solution) in the RTK-GNSS positioning is not obtained, the self-localization unit 152 performs self-localization using only the odometry calculation result by the odometry unit 151.

Next, speed control of the traveling device 1 will be described.

As illustrated in FIG. 5, the traveling device 1 includes a global planner unit 153, a local planner unit 154, an obstacle detection unit 155, and a steering control unit 156 as functions related to speed control of the traveling device 1.

The global planner unit 153 performs global planning to output a sequence of reachable way points (WP (n)) from a start point to a goal. Way points are a set of points on the travel route of the traveling device 1. A way point has information on the direction and the velocity (Vmax) in addition to the position (x,y,z).

Based on the information of way points (WP (n)) obtained from the global planner unit 153 the local planner unit 154 actually plans a path connecting a way point and a way point and calculates a target direction (WP vector, target position coordinates Pct(n), and velocity Vmax).

The obstacle detection unit 155 detects an obstacle based on a detection result of the range sensors 112 and 113. The obstacle detection unit 155 outputs an avoidance direction (θ), a speed instruction (V), and a stop instruction (V) to the steering control unit 156 in accordance with the detected obstacle. The obstacle detection unit 155 also generates the obstacle map of the road surface on which the traveling device 1 travels, using the result of obstacle detection.

The steering control unit 156 calculates the speed and the angular velocity of the traveling device 1 and calculates the speeds (VL and VR) of the right and left crawler traveling bodies 11*a* and 11*b* for steering control. The steering control unit 156 transfers the speeds (VL and VR) of the right and left crawler traveling bodies 11*a* and 11*b* to a serial interface (I/F) 157 and the motor drivers 122*a* and 122*b*, to control the travel motors 132*a* and 132*b*.

Figure 6:
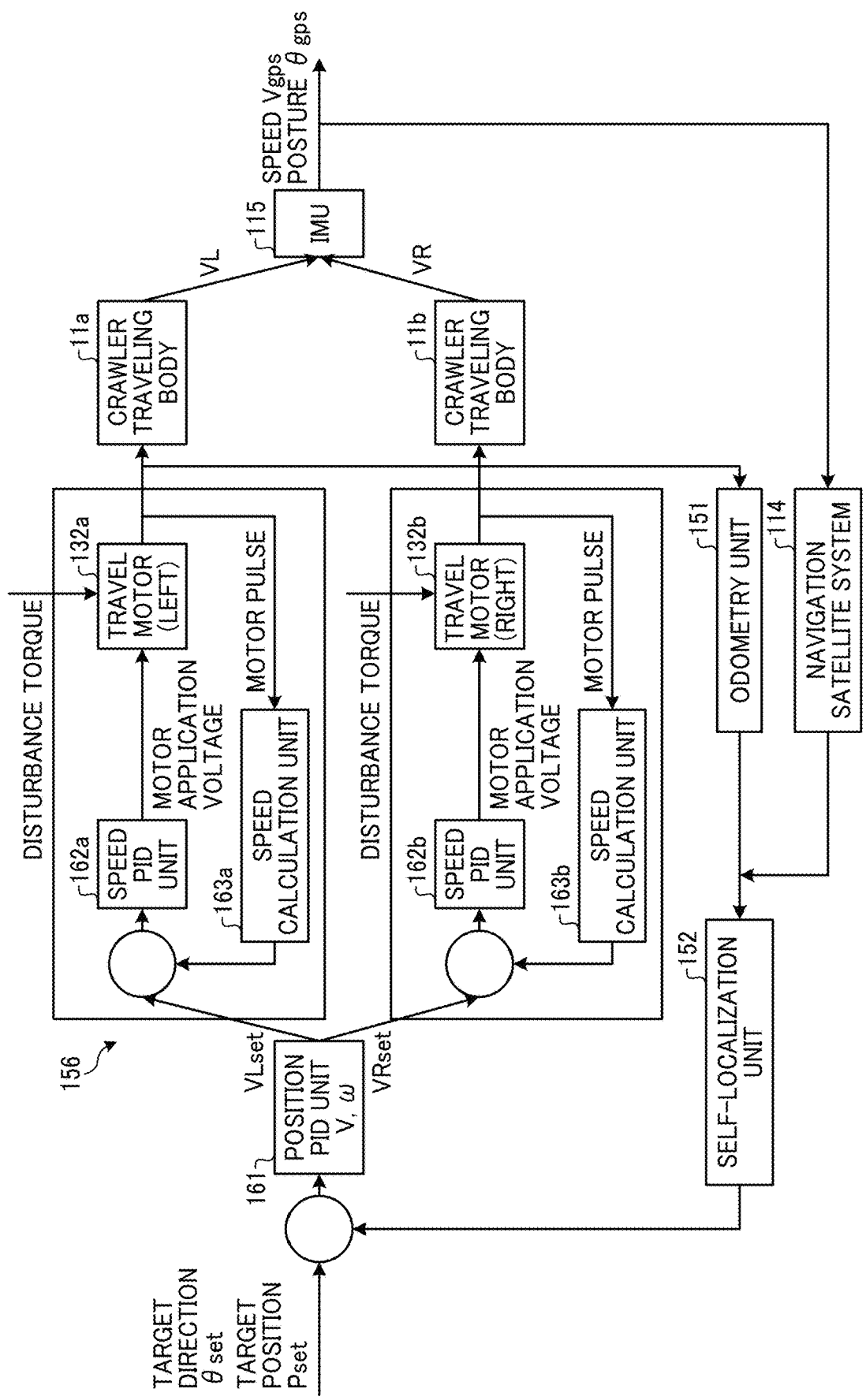
FIG. 6 is a block diagram illustrating a functional configuration related to speed control of a steering control unit according to one embodiment.

A description is given of a functional configuration related to speed control performed by the steering control unit 156. FIG. 6 is a block diagram illustrating a functional configuration related to speed control performed by the steering control unit 156.

The traveling device 1 is a crawler robot that independently drives the right and left crawler traveling bodies 11*a* and 11*b*. The traveling device 1 turns by a speed difference between the right and left crawler traveling bodies 11*a* and 11*b*. For stable traveling on various road surfaces having different traveling loads, the left and right crawler traveling bodies 11*a* and 11*b* are rotated at a designated speed regardless of the load.

For this reason, as illustrated in FIG. 6, the steering control unit 156 executes the traveling control of the traveling device 1 that is divided into a major loop for controlling the steering and a minor loop for controlling the speeds of the left and right crawler traveling bodies 11*a* and 11*b*.

As illustrated in FIG. 6, the steering control unit 156 includes a position proportional integral derivation (PID) unit 161, speed PID units 162*a* and 162*b*, and speed calculation units 163*a* and 163*b*.

The position PID unit 161 calculates operation amounts of the left and right crawler traveling bodies 11*a* and 11*b* for steering control from a difference (positional deviation) between a set value and a measured value.

The speed PID unit 162*a* and 162*b* obtain changes in the operation amounts from the speed deviation.

The speed calculation units 163*a* and 163*b* determine motor speeds based on signals (motor pulses) of hall sensors attached to the travel motors 132*a* and 132*b*.

In the major loop, the steering control unit 156 calculates differences (positional deviations) between a self-localization result and a target position (Pset) and a target direction (θset) to the target point (Pset). To obtain the self-localization result, the odometry unit 151 performs odometry calculation using the motor pulses of the travel motors 132a and 132b, and the self-localization unit 152 corrects the odometry result using the position information obtained by the navigation satellite system 114 that includes the RTK-GNSS, a posture change measured by the IMU 115, and a speed change (Vgps).

More specifically, the steering control unit 156 outputs the calculated difference (position deviation) to the position PID unit 161.

The position PID unit 161 calculates, from the difference (positional deviation) between the set value and the measured value, operation amounts VLset and VRset of the left and right crawler traveling bodies 11a and 11b (instructed speed V and rotation angle ω of the travel motors 132a and 132b) for steering control.

The traveling device 1 can travel stably by controlling the left and right crawler traveling bodies 11a and 11b in accordance with the operation amounts VLset and VRset obtained from the major loop.

In addition, in the minor loop, the steering control unit 156 determines, with the speed calculation units 163a and 163b, the motor speeds based on the signals (motor pulses) of the hall sensors attached to the travel motors 132a and 132b. Then, based on the difference (speed deviation) between the speed estimation result from the speed calculation units 163a and 163b and the target speed, the steering control unit 156 controls the motor application voltage to the travel motors 132a and 132b with the speed PID units 162a and 162b, to perform feedback control of the speed. The speed is feedback-controlled by the minor loop for minimizing speed fluctuations due to disturbance torque to the travel motors 132a and 132b.

Example of Obstacle Detection of Traveling Device

Figure 7:
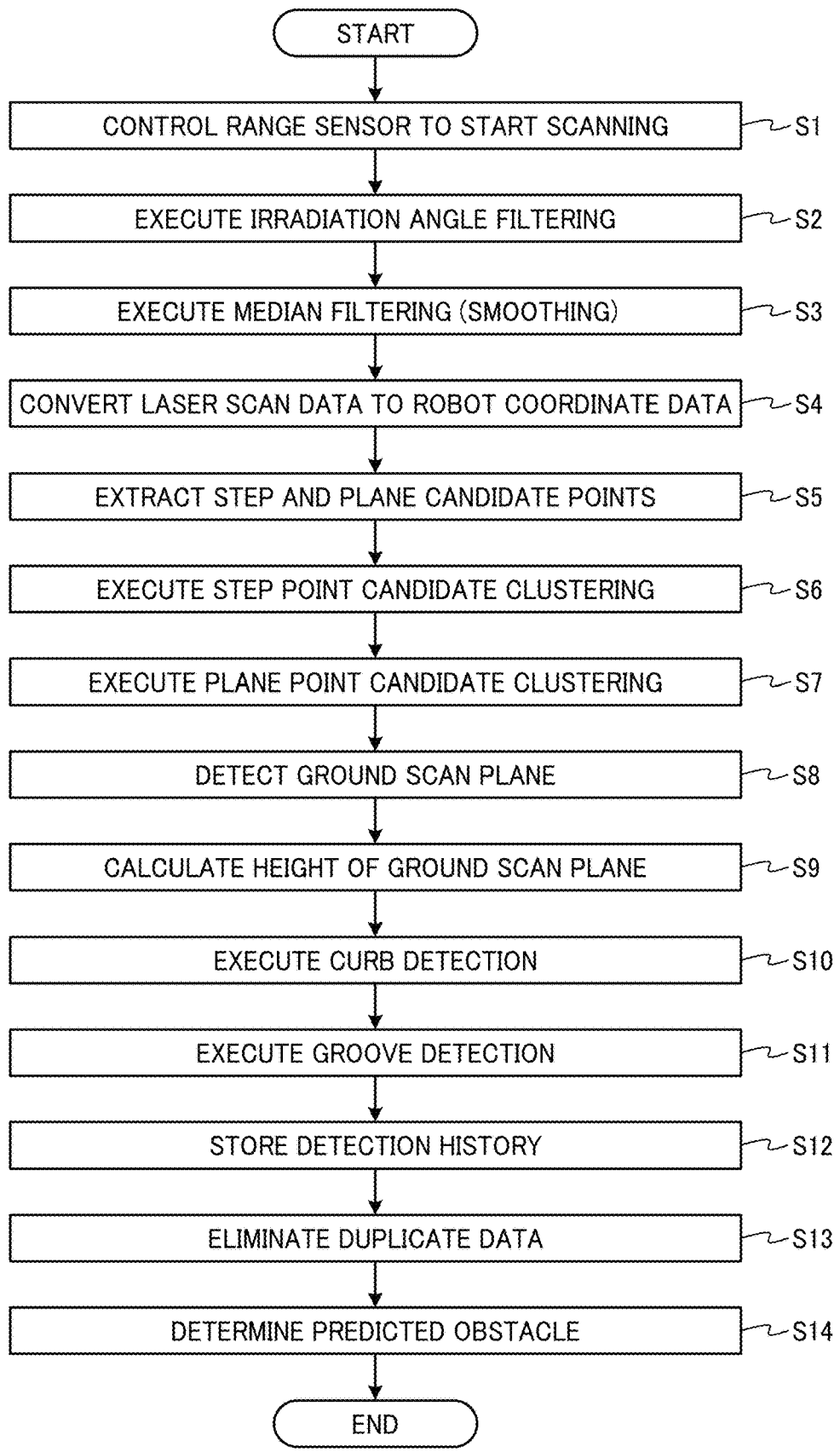
FIG. 7 is a flowchart illustrating an example of a procedure of detection of an obstacle on a road surface, performed by the traveling device according to one embodiment.

Next, with reference to FIG. 7, a description is given of the detection of an obstacle on the road surface, performed by the traveling device 1 travels in the control of the autonomous traveling of the traveling device 1. FIG. 7 is a flowchart illustrating an example of a procedure of the detection of an obstacle on a road surface, performed by the traveling device 1 according to the present embodiment. The procedure illustrated in FIG. 7 is an example in which the range sensor 113 is a 2D LIDAR.

As illustrated in FIG. 7, the CPU 101 controls the range sensor 113 to start scanning (step S1) and executes irradiation angle filtering (step S2). To be more specific, in step S2, the CPU 101 extracts only the data within ±3 m from the center in the irradiation range in the lateral direction and −62 to +62 degrees in the scanning direction from the data detected by the range sensor 113.

Next, the CPU 101 executes median filtering in which magnitudes of peripheral pixel values are compared, and the peripheral pixel values are converted into a median pixel for smoothing (step S3).

Next, the CPU 101 converts the laser scan data of the range sensor 113 into a point cloud of robot coordinates centered on the traveling device 1 (Step S4).

Next, the CPU 101 calculates, for each point, the angle formed by the current point and the point five points ahead in the height direction, i.e., the angle on the yz plane, and extracts step candidate points and plane candidate points (step S5).

The CPU 101 executes step candidate point clustering in which distance clustering is performed between the extracted step candidate points (step S6).

The CPU 101 executes plane candidate point clustering in which height clustering is performed between the extracted plane candidate points (step S7).

Then, the CPU 101 executes ground scan plane detection in which a plane candidate cluster having the longest distance is detected as a ground scan plane (step S8).

Further, the CPU 101 executes height calculation of the ground scan plane in which the average of the detected heights of the ground scan planes, in other words, the positions in the z direction is calculated as the ground height (step S9).

Next, the CPU 101 executes curb detection (step S10).

Next, the CPU 101 executes groove detection (step S11).

Figure 8:
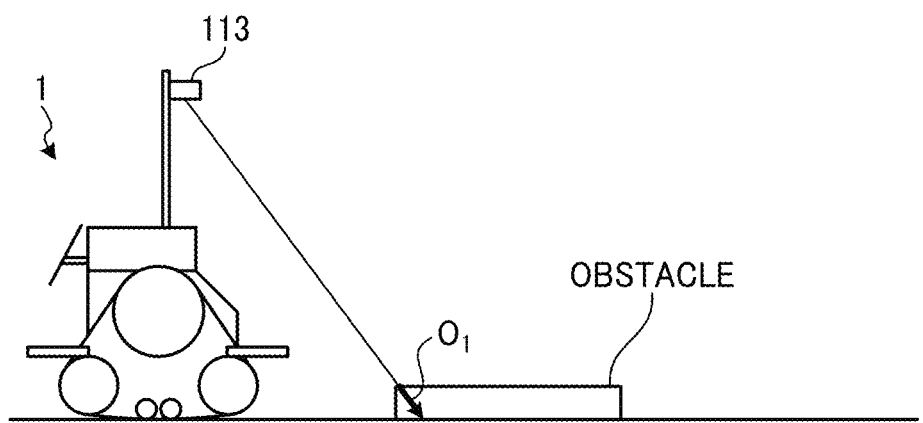
FIG. 8 is a diagram illustrating a reason for storing detection history.

Next, the CPU 101 stores a detection history (step S12). A description is given of the reason for storing the detection history. FIG. 8 is a diagram illustrating the reason for storing the detection history. When the range sensor 113 is a 2D LIDAR, as illustrated in FIG. 8, only one scan plane is obtained by one scan. Accordingly, to obtain information on a continuous obstacle, it is necessary to store a detection history from the result of one scan (for example, obstacle data $O_1$ illustrated in FIG. 8). For example, the CPU 101 stores data of the detected curbs and grooves in the auxiliary memory 103 illustrated in FIG. 4.

Figure 9:
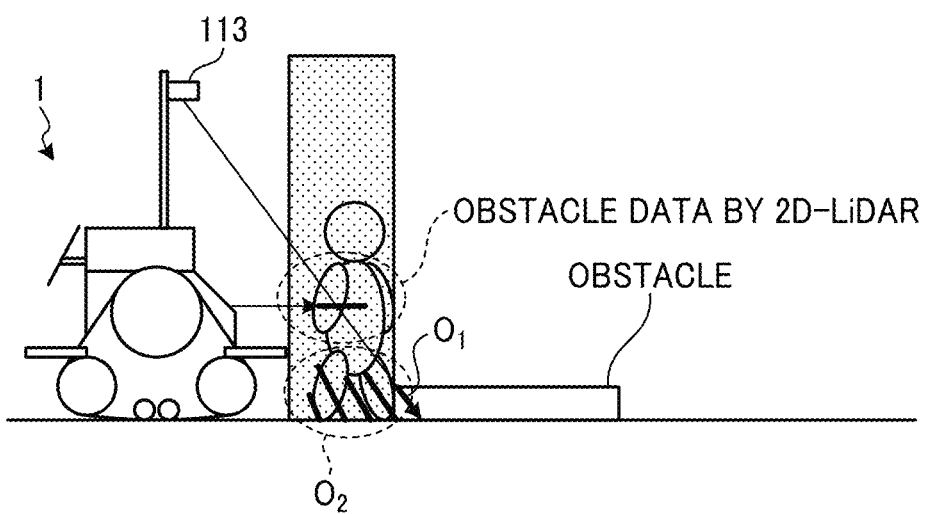
FIG. 9 is a diagram illustrating a reason for eliminating duplicate data of obstacle data.

Next, the CPU 101 eliminates duplicate data (step S13). A description is given of the reason for eliminating duplicate data. FIG. 9 is a diagram illustrating the reason for eliminating duplicate data. When the range sensor 113 is a 2D LIDAR, as illustrated in FIG. 9, data of a moving object, for example, an obstacle data $O_2$ illustrated in FIG. 9 (e.g., a leg of a walking person) is also detected as data of a continuous obstacle. In order to solve this problem, the CPU 101 eliminates, as "duplicate" data, the obstacle data at the same x-y position as the detection data obtained by the range sensor 112. To be more specific, the CPU 101 eliminates the curb/groove detection history data when the history data of the detected obstacle (curb or groove) moved to a detection history storage area is close to the x-y coordinates of the obstacle data obtained by the range sensor 112 for horizontal direction detection.

Then, the CPU 101 performs clustering on the curb/groove detection history data, so as to identify a predicted obstacle (step S14).

With this operation, the traveling device 1 of the present embodiment ends the detection of an obstacle on the road surface.

A description is given of another example of the detection of an obstacle on the road surface performed by the traveling device 1.

Figure 10:
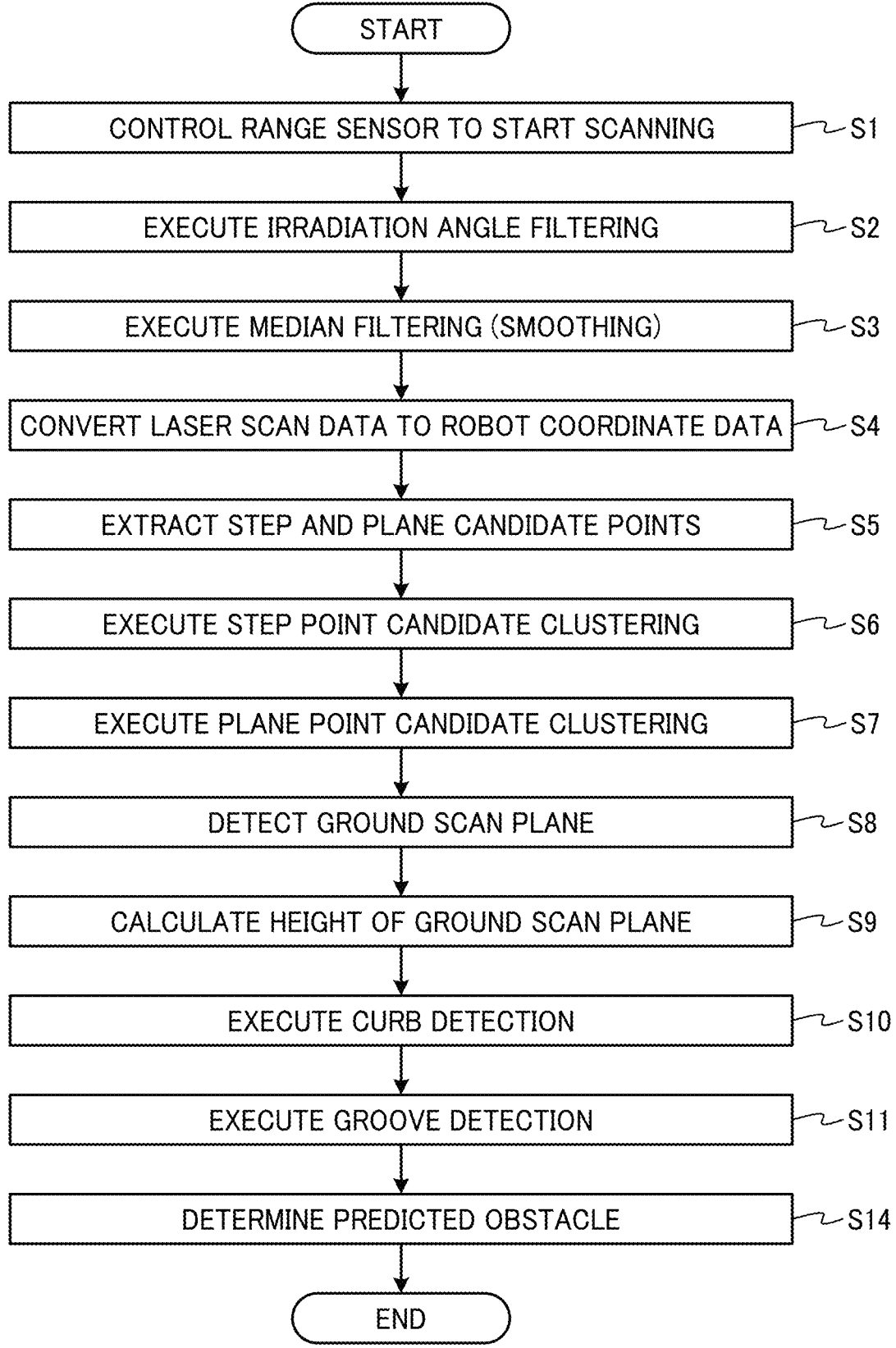
FIG. 10 is a flowchart illustrating an example of a procedure of detection of an obstacle on a road surface, performed by a traveling device according to another embodiment.

FIG. 10 is a flowchart illustrating an example of a procedure of the detection of an obstacle on a road surface, performed by the traveling device 1 according to another embodiment. FIG. 10 illustrates an example of the detection of an obstacle on a road surface in a case where the range sensor 113 is a 3D LIDAR.

The detection of an obstacle on a road surface in the case where the range sensor 113 is a 3D LIDAR illustrated in FIG. 10 is different from the detection of an obstacle on a road surface in the case where the range sensor 113 is a 2D LIDAR illustrated in FIG. 7 in that storing detection history (step S12) and eliminating duplicate data (step S13) are omitted.

Figure 11:
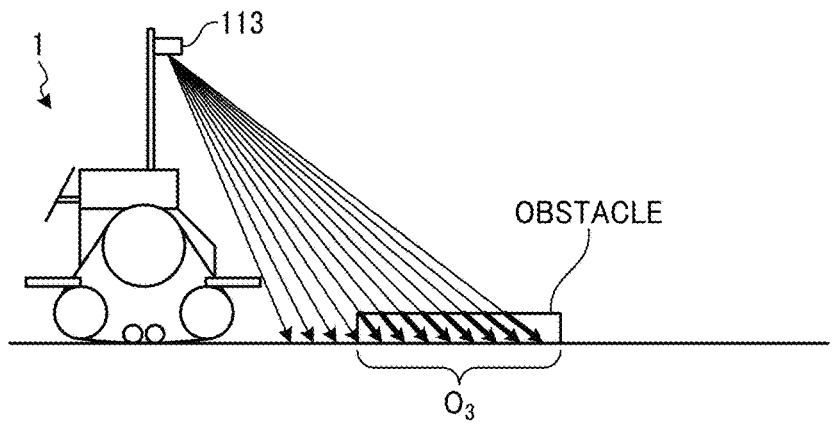
FIG. 11 is a diagram illustrating a reason for omitting storing the detection history.

A description is given of the reason for omitting storing detection history. FIG. 11 is a diagram illustrating the reason for omitting storing detection history. When the range sensor 113 is a 3D LIDAR, as illustrated in FIG. 11, there is a plurality of scan planes, and a continuous obstacle data (for example, obstacle data $O_3$ illustrated in FIG. 11) can be obtained using the detection results of the respective planes. Accordingly, it is not necessary to store the detection history from the results of a plurality of scans.

Figure 12:
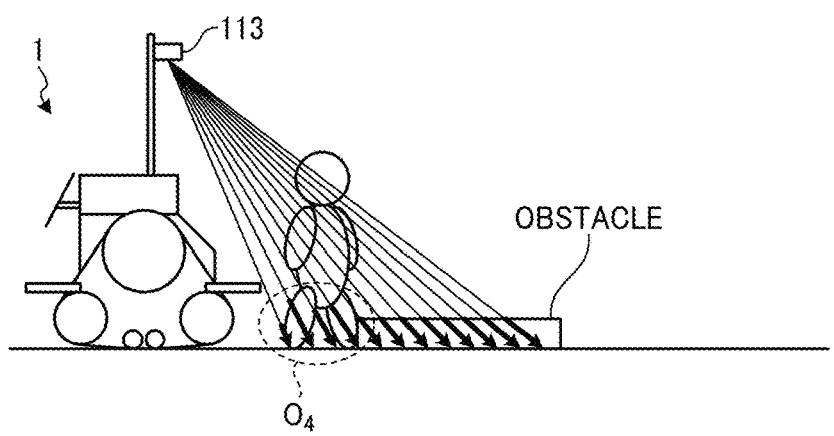
FIG. 12 is a diagram illustrating the reason for omitting eliminating the duplicate data.

Next, A description is given of the reason for omitting eliminating duplicate data. FIG. 12 is a diagram illustrating the reason for omitting eliminating duplicate data. When the range sensor 113 is a 3D LIDAR, as illustrated in FIG. 12, the 3D LIDAR has a plurality of scan planes, and an obstacle can be detected on a plurality of planes. Although the 3D LIDAR being the range sensor 113 also erroneously detects a moving obstacle such as a human leg (for example, obstacle data $O_4$ illustrated in FIG. 12), the 3D LIDAR executes a detection algorithm on real-time scan data. Accordingly, a moving obstacle is not detected when the moving obstacle goes out of the detection range. Therefore, when the range sensor 113 is a 3D LIDAR, eliminating duplicate data is not necessary.

Figure 13:
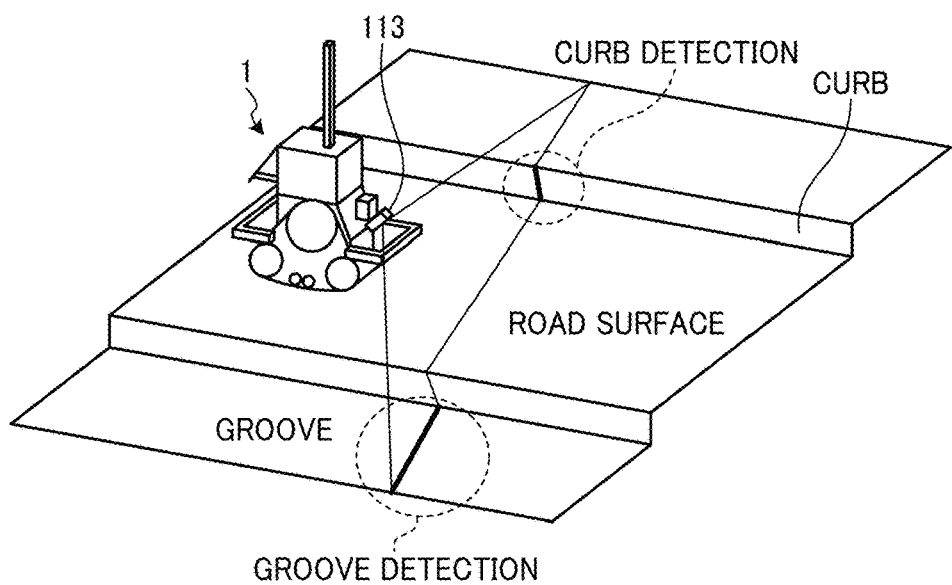
FIG. 13 is a diagram illustrating a detection example by the traveling device according to one embodiment.

FIG. 13 is a diagram illustrating a detection example by the traveling device 1 according to the present embodiment. As illustrated in FIG. 13, the CPU 101 detects edge data in the height direction detected by the range sensor 113 as a "curb" in the curb detection described above. In addition, in the above-described groove detection, the CPU 101 detects data having a height lower than the height of the road surface detected by the range sensor 113 as a "groove."

Detailed Example of Obstacle Detection by Traveling Device

Next, with reference to FIGS. 14 to 25B, a description is given in detail of some processes in the detection of an obstacle on the road surface, performed by the traveling device 1.

Figure 14:
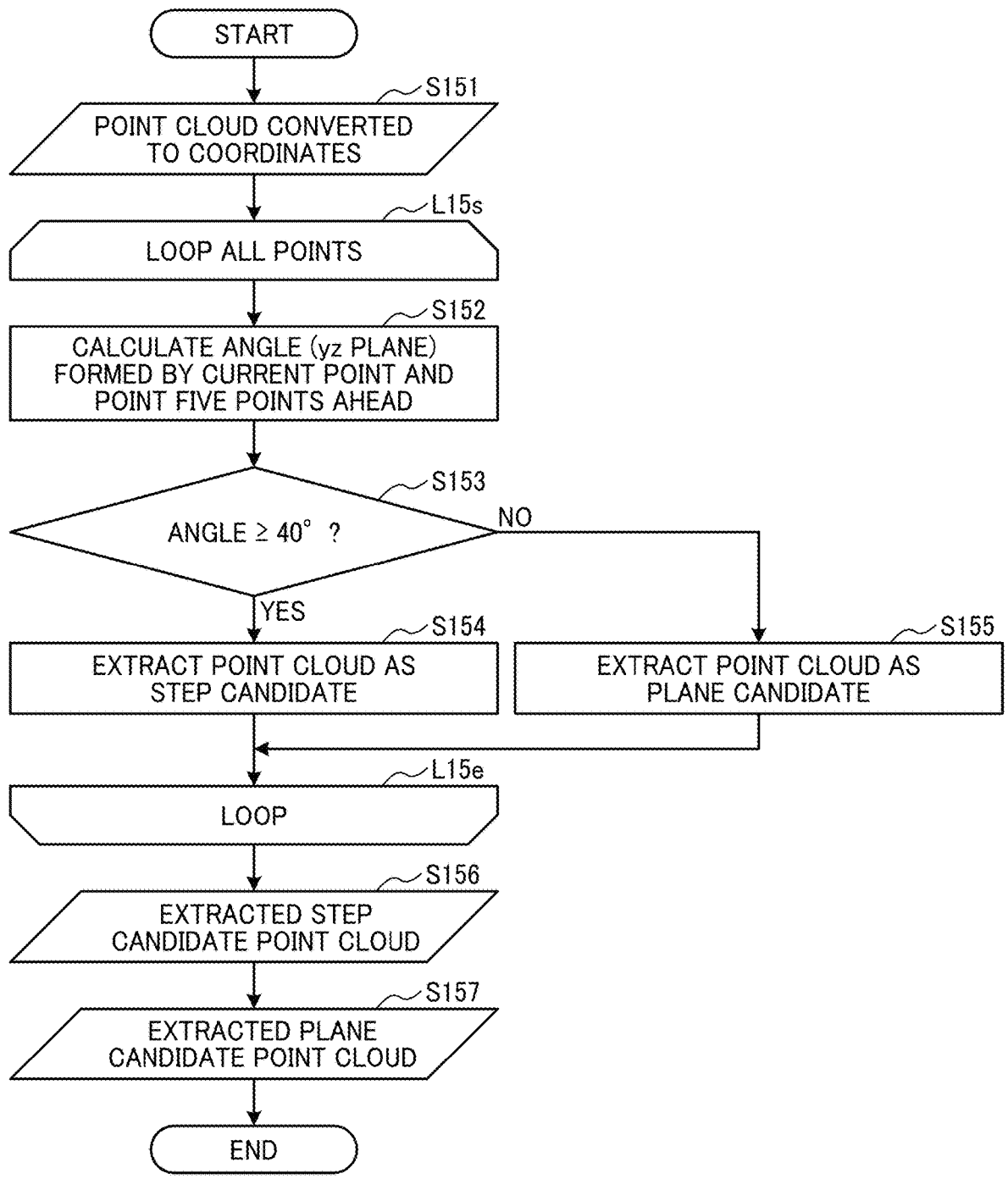
FIG. 14 is a flowchart illustrating an example of a procedure of extracting step candidate points and plane candidate points, performed by the traveling device according to one embodiment.

FIG. 14 is a flowchart illustrating an example of a procedure for extracting step candidate points and plane candidate points, performed by the traveling device 1 according to the present embodiment. The procedure illustrated in FIG. 14 is a detailed example of the processing in step S5 of FIG. 7 and step S5 of FIG. 10 described above.

As illustrated in FIG. 14, in the extraction of step candidate points and plane candidate points, the CPU 101 uses the point cloud having been converted to the robot coordinates, obtained in step S4 in FIG. 7 and step S4 in FIG. 10 described above (step S151).

Next, CPU 101 repeats the processing of S152 to S155 in the loop L15s to L15e and performs the extraction of step candidate points and plane candidate points for all point clouds.

In the loop L15s to L15e, regarding one point cloud, the CPU 101 calculates the angle formed by the current point and the point five points ahead in the height direction, i.e., the angle on the yz plane (step S152).

When the angle in the height direction is 40 degrees or greater (step S153: Yes), the CPU 101 extracts the point cloud as a step candidate (step S154). On the other hand, when the angle in the height direction is smaller than 40 degrees (step S153: No), the CPU 101 extracts the point cloud as a plane candidate (step S155).

By repeating the processing of steps S152 to S155 for all point clouds, the CPU 101 generates an extracted step candidate point cloud and an extracted plane candidate point cloud (steps S156 and S157).

With this operation, the traveling device 1 according to the present embodiment ends the extraction of step candidate points and plane candidate points.

Figure 15:
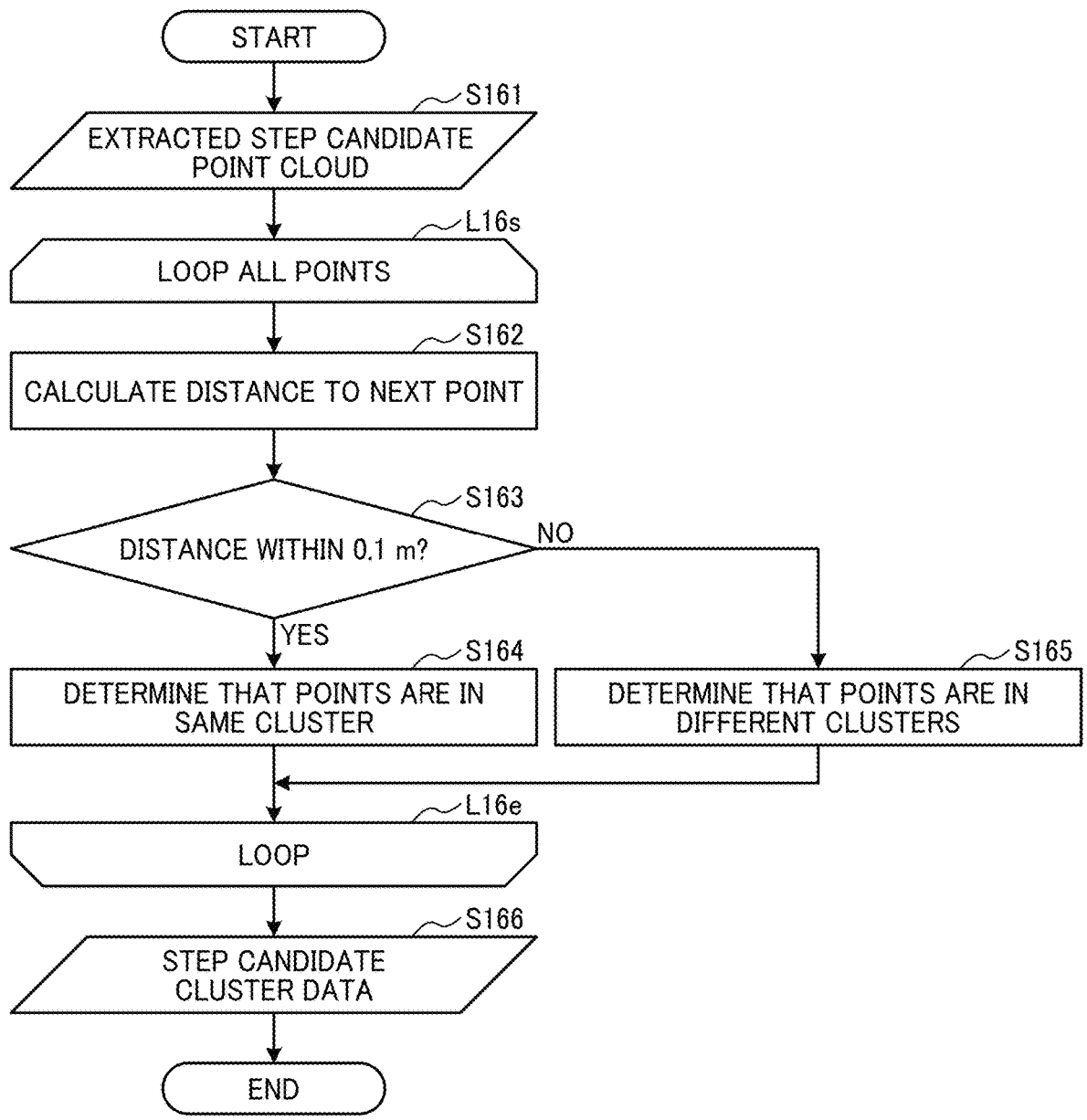
FIG. 15 is a flowchart illustrating an example of a procedure of step candidate point clustering, performed by the traveling device according to one embodiment.

FIG. 15 is a flowchart illustrating an example of a procedure of step candidate point clustering performed by the traveling device 1 according to the present embodiment. The procedure illustrated in FIG. 15 is a detailed example of the processing in step S6 of FIG. 7 and step S6 of FIG. 10 described above.

As illustrated in FIG. 15, in the step candidate point clustering, the CPU 101 uses the extracted step candidate point cloud obtained in step S156 in FIG. 14 (step S161).

Next, the CPU 101 repeats the processing of steps S162 to S165 in the loop L16s to L16e, and performs the step candidate point clustering for all extracted step candidate point clouds.

In the loop L16s to L16e, the CPU 101 calculates, for each extracted step candidate point cloud, the distance between a point (target point) represented by the extracted step candidate point cloud and the next point (step S162).

When the distance from the target point to the next point is within a predetermined radius, e.g., 0.1 m (within the circle having a radius of 0.1 m, centered on the target point) (step S163: Yes), the CPU 101 determines that these points are in the same cluster (step S164). On the other hand, when the distance from the target point to the next point exceeds the radius of 0.1 m (step S163: No), the CPU 101 determines that these points belong to different clusters (step S165).

By repeating the processing of steps S162 to S165 for all extracted step candidate point clouds, the CPU 101 generates step candidate clusters (step S166).

With this operation, the traveling device 1 according to the present embodiment ends the step candidate point clustering.

Figure 16:
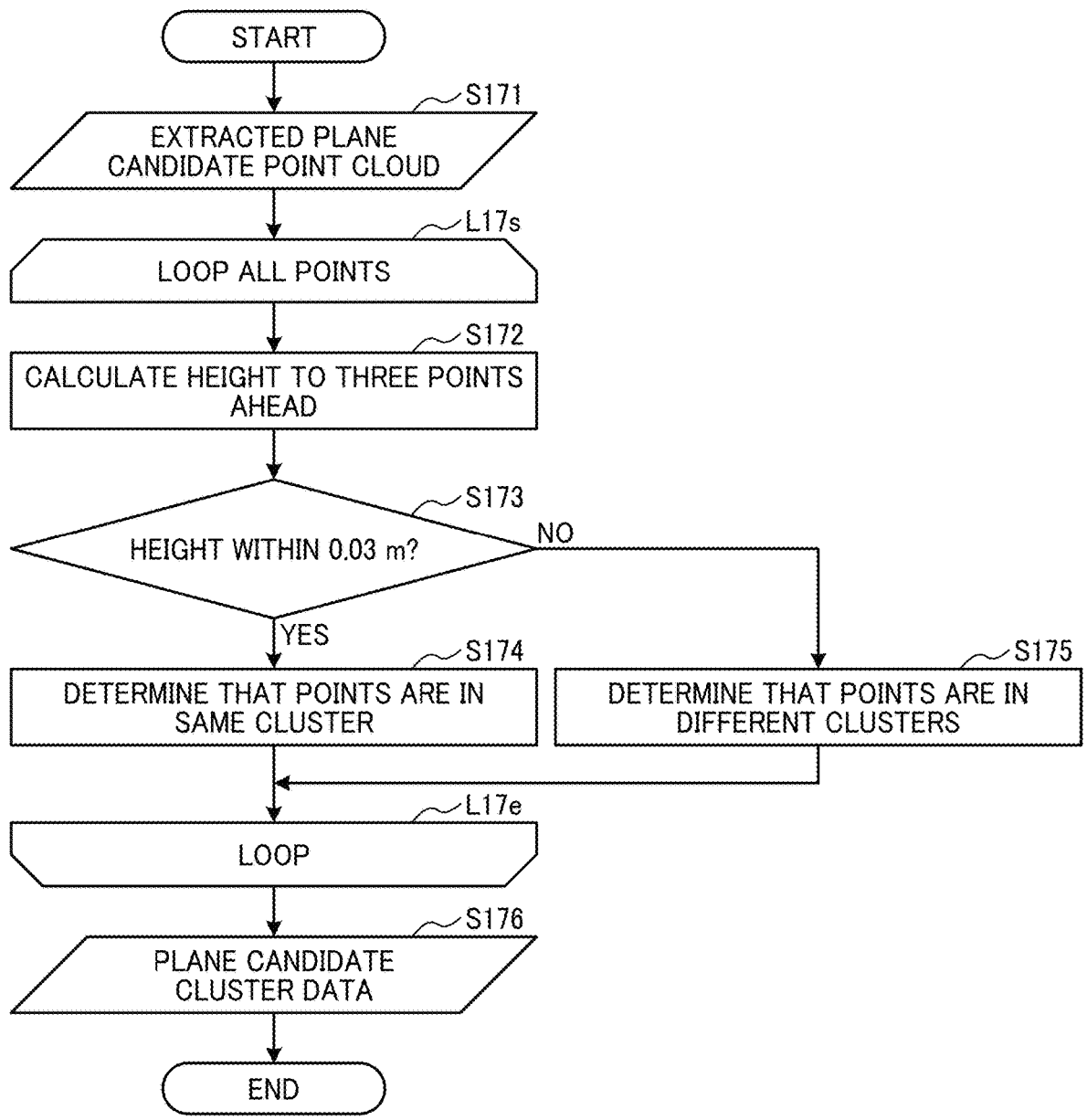
FIG. 16 is a flowchart illustrating an example of a procedure of plane candidate point clustering, performed by the traveling device according to one embodiment.

FIG. 16 is a flowchart illustrating an example of a procedure of plane candidate point clustering, performed by the traveling device 1 according to the present embodiment. The procedure illustrated in FIG. 16 is a detailed example of the processing in step S7 of FIG. 7 and step S7 of FIG. 10 described above.

As illustrated in FIG. 16, in the plane candidate point clustering, the CPU 101 uses the extracted plane candidate point cloud obtained in step S157 in FIG. 14 (step S171).

Next, the CPU 101 repeats the processing of steps S172 to S175 in the loop L17s to L17e and performs the plane candidate point clustering for all extracted plane candidate point clouds.

In the loop L17s to L17e, the CPU 101 calculates, fix each extracted plane candidate point cloud, the height from a point (target point) represented by the extracted plane candidate point cloud to a point three points ahead (step S172).

When the height from the target point to the point three points ahead is within 0.03 m (step S173: Yes), the CPU 101 determines that these points are in the same cluster (step S174). On the other hand, when the height from the target point to the point three points ahead exceeds 0.03 m (step S173: No), the CPU 101 determines that these points belong to different clusters (step S175).

By repeating the processing of steps S172 to S175 for all extracted step candidate point clouds, the CPU 101 generates plane candidate clusters (step S176).

With this operation, the traveling device 1 according to the present embodiment ends the plane candidate point clustering.

Figure 17:
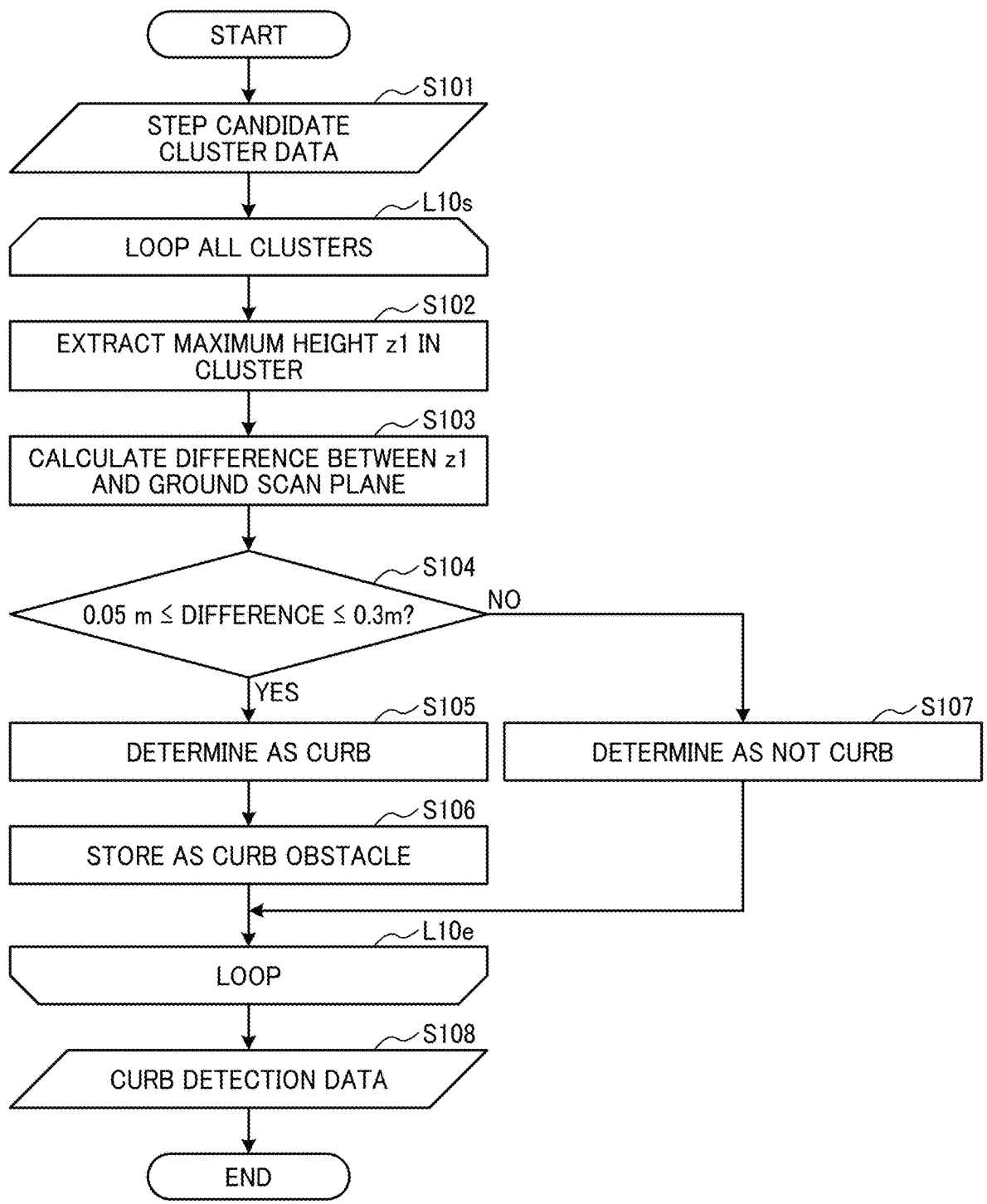
FIG. 17 is a flowchart illustrating an example of a procedure of curb detection, performed by the traveling device according to one embodiment.

FIG. 17 is a flowchart illustrating an example of a procedure of curb detection performed by the traveling device 1 according to the present embodiment. The procedure illustrated in FIG. 17 is a detailed example of the processing in step S10 of FIG. 7 and step S10 of FIG. 10 described above.

As illustrated in FIG. 17, in the curb detection, the CPU 101 uses the step candidate clusters obtained in step S166 in FIG. 15 described above (step S101).

Next, the CPU 101 repeats the processing of steps S102 to S107 in the loop L10s to L10e and performs the curb detection for all the step candidate clusters.

In the loop from L10s to L10e, for each step candidate cluster, the CPU 101 extracts, data having a maximum height z1 in the step candidate cluster (step S102).

Then, the CPU 101 calculates a difference between the maximum height z1 in that step candidate cluster and a height zg of the ground scan plane (step S103). To be specific, the CPU 101 calculates the height of the highest point in the step candidate cluster from the ground by using the expression: z1−zg, where z1 represents the maximum highest in the cluster and zg represents the height of the ground scanning plane.

Next, when the height of the highest point in the step candidate cluster from the ground is equal to or greater than 0.05 m and equal to or smaller than 0.3 m (step S104: Yes), the CPU 101 determines that the step candidate cluster represents a curb (step S105) and stores the step candidate cluster as a curb obstacle in the memory 102 (step S106). On the other hand, when the height of the highest point in the step candidate cluster from the ground is out of the range from 0.05 m or greater to 0.3 m or smaller (step S104: No), the CPU 101 determines that the step candidate cluster is not a curb (step S107).

By repeating the processing of steps S102 to S107 for all the step candidate clusters, the CPU 101 generates curb detection data, in other words, a group of data each detected as a curb (step S108).

With this operation, the traveling device 1 according to the present embodiment ends the curb detection.

Figure 18:
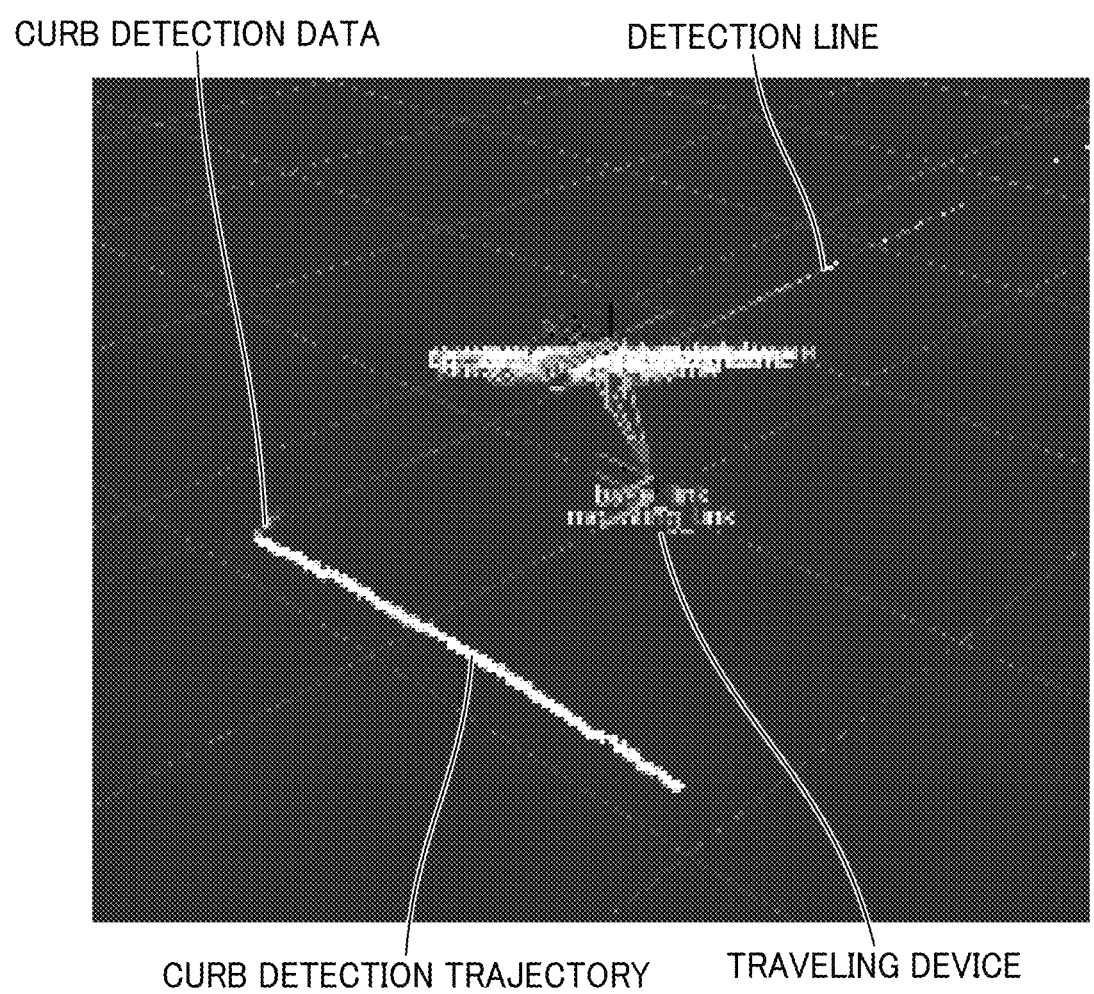
FIG. 18 is a diagram illustrating an example of a plot of curb detection data obtained by the curb detection, performed by the traveling device according to one embodiment.

The CPU 101 plots the coordinates indicated by each curb detection data obtained in the curb detection, so that a curb extending in a predetermined direction can be grasped. FIG. 18 illustrates an example of curb detection data plotted by the CPU 101.

FIG. 18 is a diagram illustrating an example of a plot of the curb detection data obtained by the curb detection performed by the traveling device 1 according to the present embodiment.

As illustrated in FIG. 18, a plot (detection trajectory) of a curb extending in a predetermined direction is obtained by plotting a plurality of point clouds having been determined as indicating a curb. In other words, as described above, in a case where results of a plurality of times of (N times) of measurements obtained by the range sensor 113 include feature values indicating similar unevenness, the feature values are grouped as a cluster and held as the curb detection data. Accordingly, an obstacle such as a continuous curb can be detected.

Figure 19:
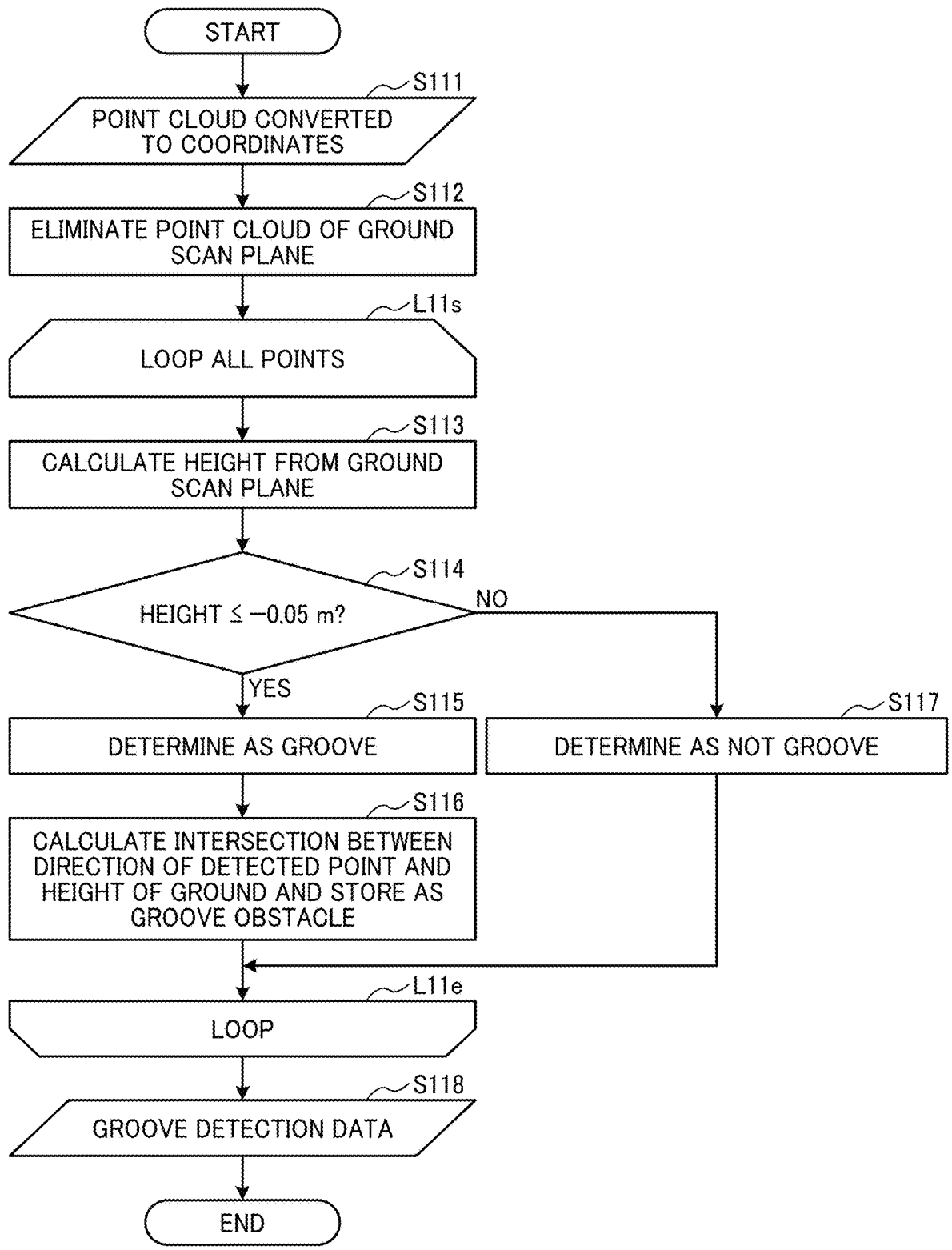
FIG. 19 is a flowchart illustrating an example of a procedure of groove detection, performed by the traveling device according to one embodiment.

FIG. 19 is a flowchart illustrating an example of a procedure of groove detection performed by the traveling device 1 according to the present embodiment. The procedure illustrated in FIG. 19 is a detailed example of the processing in step S11 of FIG. 7 and step S11 of FIG. 10 described above.

As illustrated in FIG. 19, in the groove detection, the CPU 101 uses the point clouds having been converted into the robot coordinates, obtained in step S4 in FIG. 7 and step S4 in FIG. 10 described above (step S111).

Next, the CPU 101 eliminates the point cloud determined as the ground scan plane from the point clouds (step S112).

Next, the CPU 101 repeats the processing of steps S113 to S117 in the loop L11s is to L11e and performs the groove detection for all point clouds.

In the loop L11s is to L11e, the CPU 101 calculates the height between the ground scan plane and one of the point clouds from which the ground scan plane has been eliminated (step S113). To be specific, the CPU 101 calculates the height between the point cloud and the ground scan plane by using the expression: zg−z, where zg represents the height of the ground scanning plane and z represents the height of the point represented by that point cloud.

Next, when the calculated height is equal to or smaller than −0.05 m (step S114: Yes), the CPU 101 determines that the point cloud represents a groove (step S115). Then, the CPU 101 stores the intersection between the direction of the detected point and the ground height as an obstacle in the memory 102 (step S116). On the other hand, when the calculated height exceeds −0.05 m (step S114: No), the CPU 101 determines that the point cloud does not represent a groove (step S117).

By repeating the processing of steps S113 to S117 for all point clouds, the CPU 101 generates groove detection data that is a set of data detected as a groove (step S118).

With this operation, the traveling device 1 according to the present embodiment ends the groove detection.

Figure 20A:
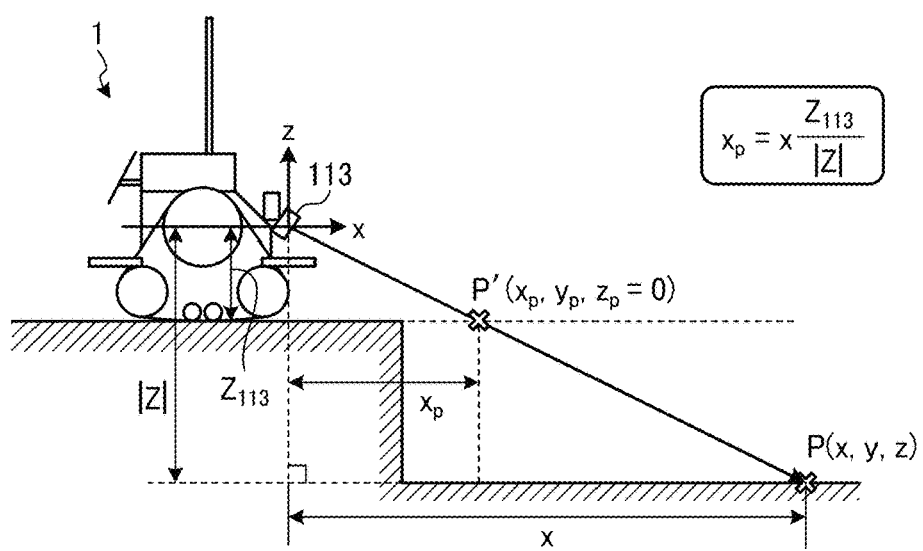
FIGS. 20A and 20B are diagrams illustrating a plot example of groove detection data obtained by the groove detection, performed by the traveling device according to one embodiment.
Figure 20B:
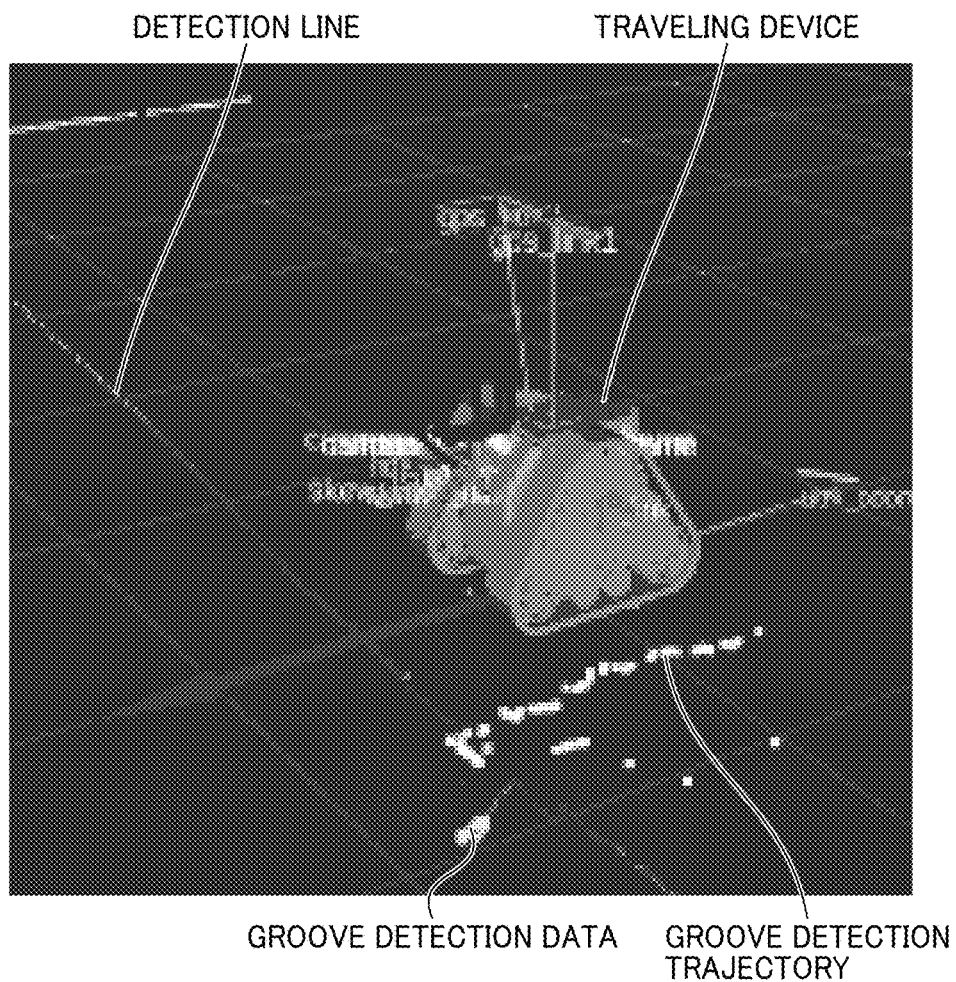

The CPU 101 plots the coordinates indicated by each groove detection data obtained by the groove detection, so that a groove extending in a predetermined direction can be grasped. FIGS. 20A and 20B illustrate an example of the groove detection data detected by the CPU 101 and plots thereof.

FIGS. 20A and 20B are diagrams illustrating a plot example of the groove detection data obtained by the groove detection performed by the traveling device 1 according to the present embodiment. FIG. 20A is a diagram illustrating in detail the processing of step S116 in FIG. 19 described above. FIG. 20B illustrates an example in which the traveling device 1 plots a plurality of groove detection data.

As illustrated in FIG. 20A, when the CPU 101 determines that one point cloud represents a groove, in step S116 in FIG. 19, the CPU 101 calculates, from the coordinates (x,y,z) of a point P represented by that point cloud, coordinates $(x_p, y_p, z_p)$ of an intersection point P' between the direction indicated by the point cloud and the ground height.

The coordinate $x_p$ of the intersection point P' can be obtained from the following equation.

$$x_p = x \times (z_{113})/|z|$$

In the above equation, $z_{113}$ represents the height (distance) from the range sensor 113 to the ground scan plane, and z represents a difference (distance) between the height position of the range sensor 113 and the height position indicated by the z coordinate of the coordinates (x,y,z) of the point P.

The coordinate $z_p$ of the intersection point P' is the z coordinate of the height position of the ground scan plane. The coordinate $y_p$ of the intersection point P' is the y coordinate on a line segment connecting the coordinates of the position of the range sensor 113 and the coordinates (x,y,z) of the point P and at the height position of the coordinate $z_p$.

Thus, the CPU 101 can calculate the coordinates $(x_p, y_p, z_p)$ of the intersection point P' between the direction indicated by the point cloud and the ground height.

As illustrated in FIG. 20B, a plot (detection trajectory) of a groove extending in a predetermined direction is obtained by plotting a plurality of point clouds having been determined as indicating a groove. In other words, as described above, in a case where results of a plurality of times of (N times) of measurements obtained by the range sensor 113 include feature values indicating similar unevenness, the feature values are grouped as a cluster and held as the groove detection data. Accordingly, an obstacle such as a continuous groove can be detected.

FIG. 21 is a flowchart illustrating an example of a procedure for generating and storing curb/groove detection history data performed by the traveling device 1 according to the present embodiment. The procedure illustrated in FIG. 21 is a detailed example of the processing in steps S12 and S13 in FIG. 7 described above.

As illustrated in FIG. 21, in the detection history storing performs by the CPU 101, the curb detection data obtained in step S108 in FIG. 17 and the groove detection data obtained in step S118 in FIG. 19 are used (step S121).

The CPU 101 executes the detection history storing (step S122). Specifically, the CPU 101 calculates the movement amount and traveling direction of the traveling device 1 in real space using odometry and moves the detection data in the robot coordinate system by the amount corresponding to the calculated movement amount and traveling direction. Then, the CPU 101 moves the detection data within the radius of 2 m from the robot coordinate origin from the memory 102 to the detection history storage area of the auxiliary memory 103 and stores the detection data therein.

Odometry is a method of calculating rotation angles of wheels and a steering wheel in a wheeled mobile robot to obtain respective movement amounts and determining the position of the robot from cumulative calculation thereof. Odometry is called a self-position and posture estimation method or the like.

Next, the CPU 101 eliminates duplicate data (step S123). Specifically, the CPU 101 compares the curb/groove detection history data moved to the detection history storage area with the x-y coordinates of the curb/groove data obtained by the range sensor 112 for horizontal direction detection. In a case where the moved curb/groove detection history data is close to (for example, within 0.3 m of) the curb/groove data obtained by the range sensor 112, the CPU 101 eliminates the moved curb/groove detection history data.

Through such operation, the CPU 101 generates and stores the curb/groove detection history data (step S124).

With this operation, the traveling device 1 according to the present embodiment ends the generating and storing of curb/groove detection history data.

In the related art of detecting obstacles for an autonomous traveling body, it is desired to scan as far ahead as possible in order to quickly find obstacles on a road surface. However, in a configuration for scanning a far distance, there is a risk that obstacles (such as holes or steps) on a road surface near the foot is not detected and the autonomous traveling body will hit the obstacle when the autonomous traveling body turns.

As described above, the CPU 101 of the traveling device 1 of the present embodiment performs the following operation so as not to detect noise, a small hole, or the like as an obstacle on a road surface. Specifically, the CPU 101 stores data for a predetermined period of time or a predetermined distance, determines the size of a continuous obstacle or hole, and recognizes a linear obstacle on the road surface. Thus, the CPU 101 determines the linear obstacle as, for example, a curb, a groove (roadside ditch), or a hole (asphalt peeling off) on the road surface.

Figure 22B:
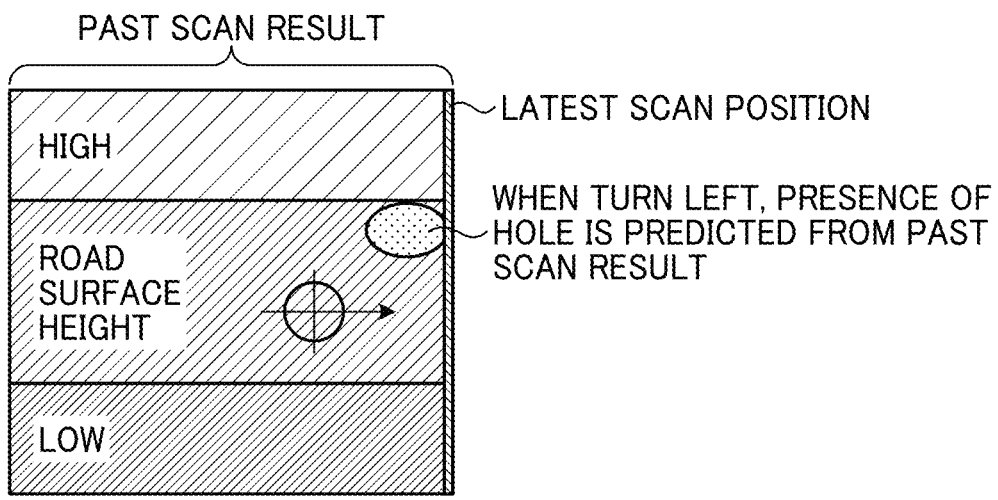

FIGS. 22A and 22B are diagrams illustrating an example in which the traveling device 1 according to the present embodiment changes the traveling direction with reference to past scan results.

As illustrated in FIGS. 22A and 22B, the CPU 101 accumulates the information on the obstacle on the road surface, obtained by one scan by the range sensor 113, for a predetermined time or a predetermined distance, and recognizes sequential points as one obstacle. With this operation, the traveling device 1 determines that there is an obstacle that cannot be passed through even when the obstacle is partially shielded. According to the example illustrated in FIGS. 22A and 22B, the past scan results indicate that there is a hole when the traveling device 1 tries to turn left (upper right in FIG. 22A).

As described above, storing the scan results for the predetermined time or the predetermined distance enables the determination on whether there is an obstacle when the traveling direction is changed.

In addition, there is a case where, fix example, grass hides a part of an obstacle such as a hole or a step or made the obstacle look smaller than the actual size. In this way, when the obstacle is covered with grass at the same height as the road surface, the road surface looks continuous.

As described above, when one or more feature values having a specific feature are included in a determination area detected by the range sensor 113, the CPU 101 of the traveling device 1 of the present embodiment recognizes the size of an obstacle such as a continuous hole or step.

Figure 23A:
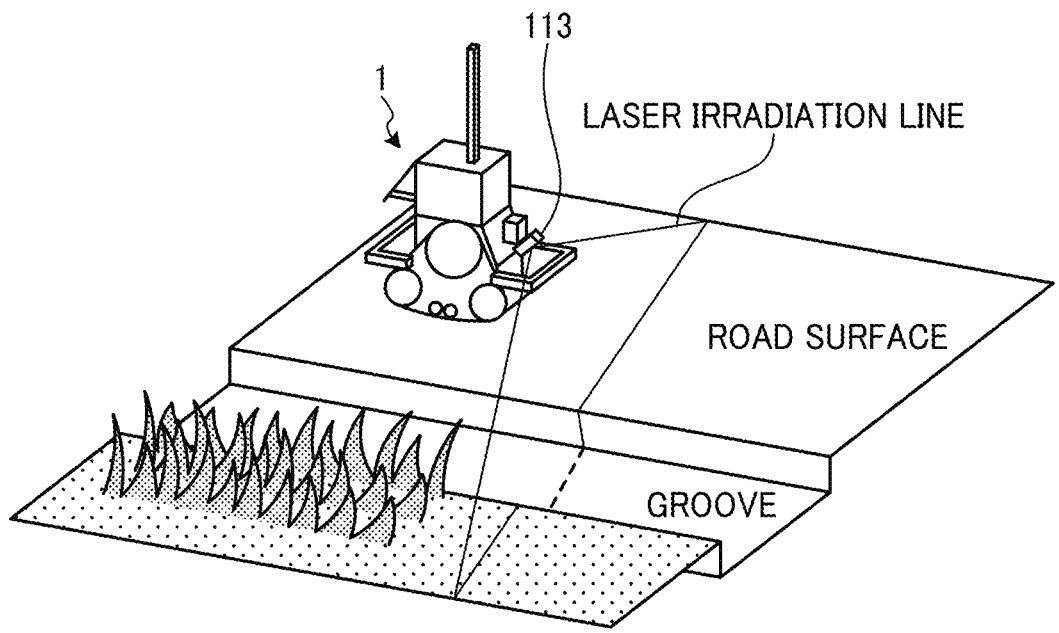
FIGS. 23A and 23B are diagrams illustrating an example of operation for a shielding object, performed by the traveling device according to one embodiment.
Figure 23B:
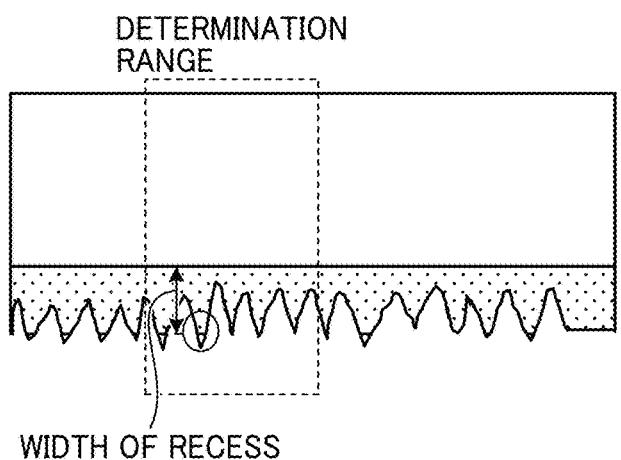

FIGS. 23A and 23B are diagrams illustrating an example of operation for a shielding object performed by the traveling device 1 according to the present embodiment.

As illustrated in FIG. 23A, grass may cover a roadside ditch, for example, when the lid of the roadside ditch is open. In this example, the following three features are applied as the specific feature values.

Feature 1: feature values indicating unevenness are sequentially detected;

Feature 2: depth of recess; and

Feature 3: maximum width of recess

Among the above three features, the feature 1 indicates a case where the feature values indicate, for example, a linear recess.

Even when the roadside ditch is partially hidden by, for example, grass, in a case of a linear recess having a predetermined depth or more, the CPU 101 determines that the maximum width of the recess in the determination area continues a predetermined length.

Figure 24:
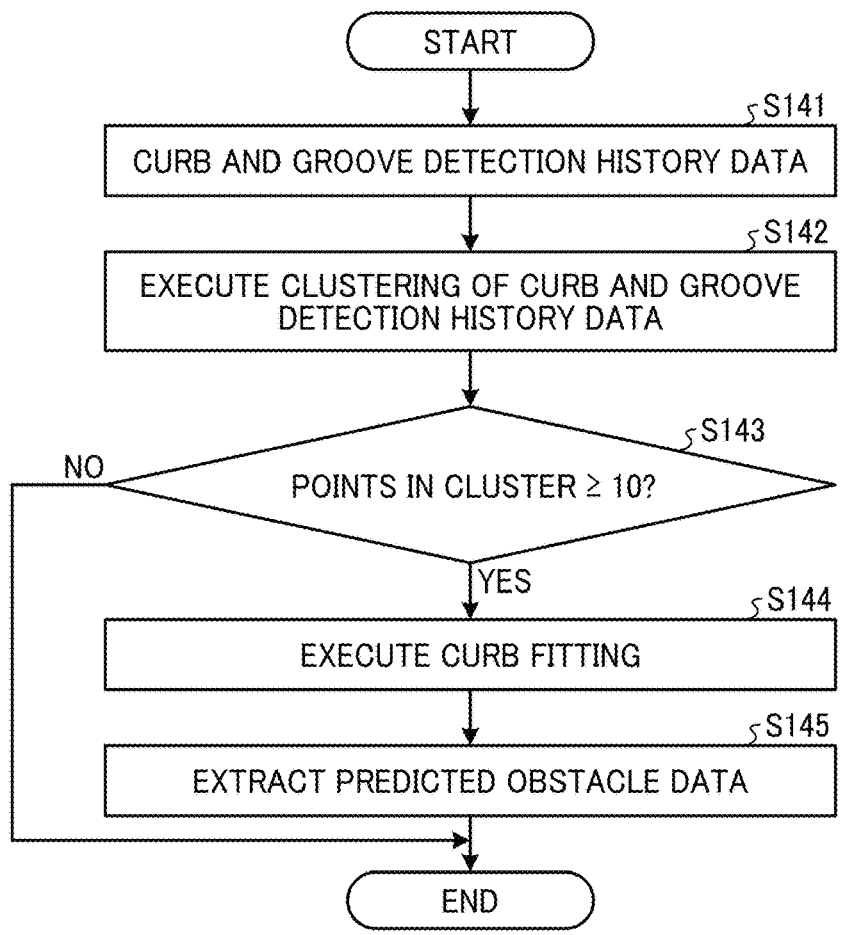
FIG. 24 is a flowchart illustrating an example of a procedure of prediction, performed by the traveling device according to one embodiment.

FIG. 24 is a flowchart illustrating an example of a procedure of prediction performed by the traveling device 1 according to the present embodiment. The procedure illustrated in FIG. 24 is a detailed example of the processing in step S14 of FIG. 7 and step S14 of FIG. 10 described above.

As illustrated in FIG. 24, the CPU 101 first obtains the curb/groove detection history data (step S141) and executes a curb/groove detection history clustering (step S142). In the curb/groove detection history clustering, when there is another point within the radius of 0.1 m from the target point, that point is regarded as belonging to the same cluster as the target point.

Next, when the number of points in the cluster is equal to or greater than 10 (step S143: Yes), the CPU 101 executes curve-fitting by polynomial approximation of fourth or higher degree, using the data in the cluster (step S144). Curve fitting is a process for obtaining a curve that best fits experimentally obtained data or constraints.

Then, the CPU 101 extracts, as an obstacle, data up to 14 points ahead, that is, up to 1 m ahead, of the latest detection result from the curve fitting result, which is referred to as predicted obstacle data extracting (step S145).

More specifically, when a predetermined number of feature values indicating unevenness (such as a hole and a step) are sequentially detected within a predetermined radius, the CPU 101 performs curve-fitting prediction based on the sequential information indicating that the predetermined number of feature values indicating unevenness are sequentially detected, so as to generate an obstacle map of the front region of the traveling device 1, not scanned by the range sensor 113.

On the other hand, when the number of points in the cluster is smaller than 10 (step S143: No), the CPU 101 ends the processing.

With this operation, the traveling device 1 according to the present embodiment ends the prediction.

In the related art of detecting obstacles for an autonomous traveling body, obstacles such as holes or steps in front of a detection line which is a laser irradiation line of the range sensor 113 are not detected.

In the traveling device 1 according to the present embodiment, when an obstacle having a continuous characteristic is detected, the CPU 101 determines that the obstacle continues in an undetected area and extends the determination area as described above. In other words, the CPU 101 includes an undetected area in the determination area. Thus, the CPU 101 predicts an obstacle ahead based on data having continuity.

Figure 25A:
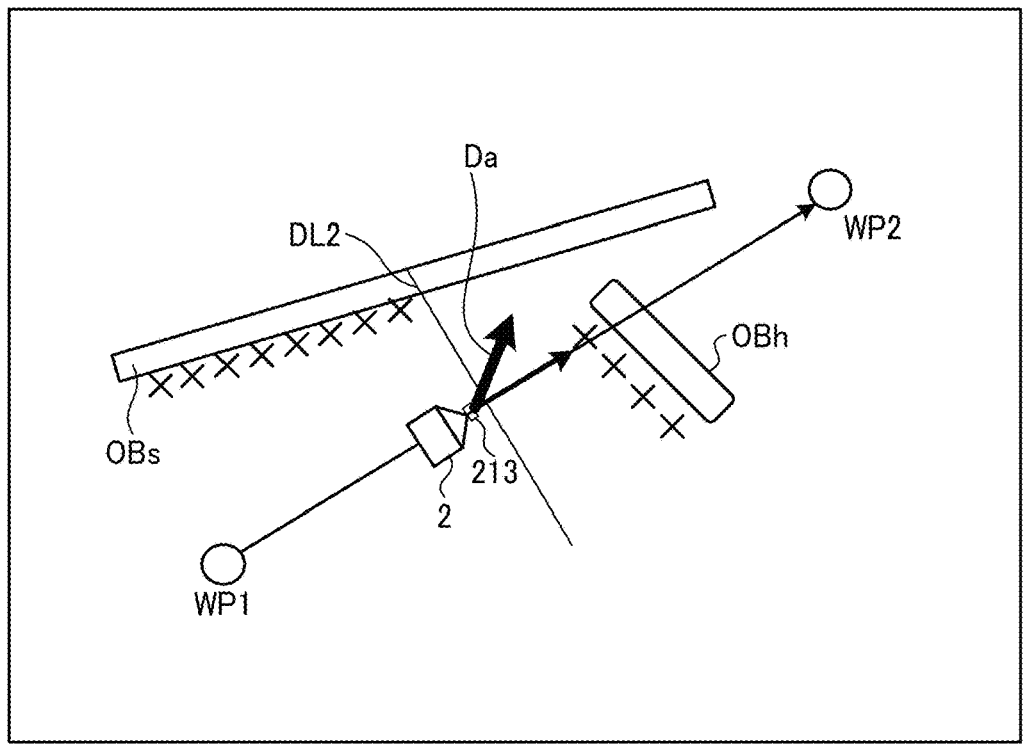
FIG. 25A is a diagram illustrating detection of a front region, performed by a traveling device according to a comparative example.
Figure 25B:
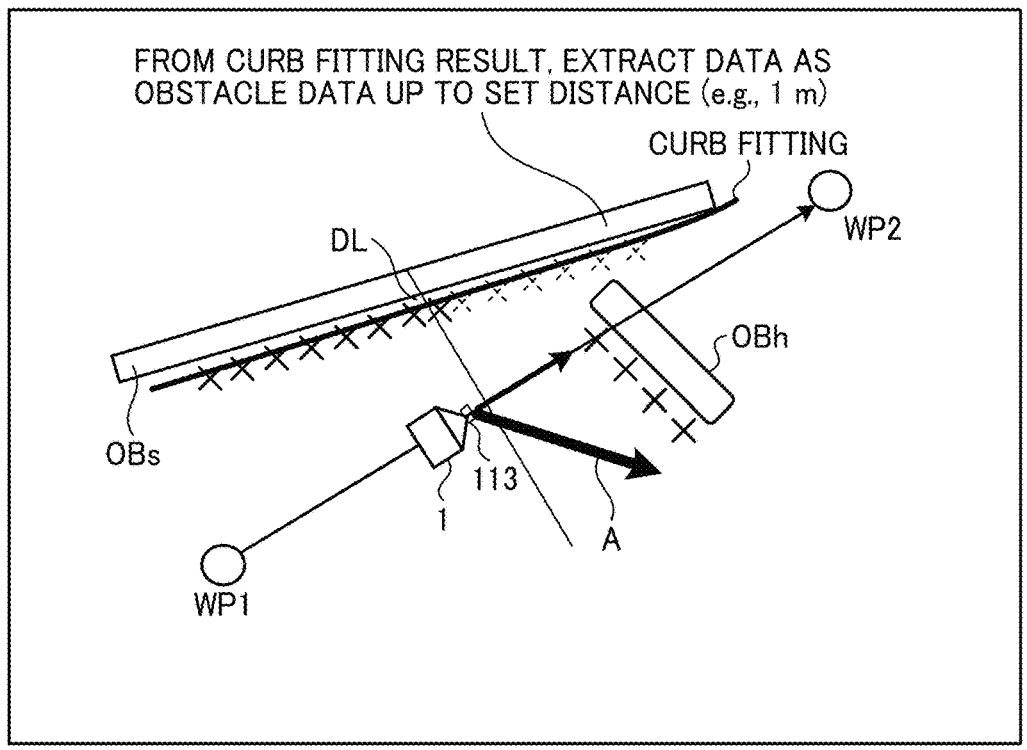
FIG. 25B is a diagram illustrating an example of prediction of an obstacle ahead of a detection line, performed by the traveling device according to one present embodiment.

FIG. 25A is a diagram illustrating detection of a front region, performed by a traveling device 2 according to a comparative example. FIG. 25B is a diagram illustrating an example of prediction of an obstacle ahead of a detection line DL, performed by the traveling device 1 according one present embodiment.

In the examples illustrated in FIGS. 25A and 25B, an obstacle OBh having a height is present in the traveling direction of the traveling device 1 (the traveling device 2 in FIG. 25A) from a way point WP1 to a way point WP2, and an obstacle OBs such as a roadside ditch or a curb is present on the side of the road surface on which the traveling device 1 (the traveling device 2 in FIG. 25A) travels. The obstacle OBs is provided such that the distance to the obstacle OBh gradually decreases from the WP1 to the WP2 in the traveling direction of the traveling device 1 (the traveling device 2 in FIG. 25A).

As illustrated in FIG. 25A, the traveling device 2 of the comparative example includes a range sensor 223 for oblique direction detection. The range sensor 223 cannot detect the area ahead of a detection line DL2. In addition, the traveling device 2 selects a path as close to a straight line as possible as the avoidance direction for the traveling device 2 to avoid the obstacle. In this case, the traveling device 2 travels in the direction indicated by arrow Da. Since the obstacle OBs is present in the undetected determination area in the traveling direction, the traveling device 2 fails to timely avoid the obstacle OBs or fails to timely stop.

As illustrated in FIG. 25B, according to the present embodiment, in the case of the linearly continuous obstacle, the traveling device 1 predicts that the obstacle is continuous also ahead of the detection line DL and extended the obstacle data. As a result, the traveling device 1 determines that the direction that passes between the obstacle OBh and the obstacle OBs is not appropriates for avoiding the obstacle, and selects an avoidance route in the direction indicated by arrow A which is the opposite direction to the side on which the obstacle OBs is present.

Note that the CPU 101 may combine the data with an image and perform the above determination based on the continuity on the image. In addition, the CPU 101 may change the detection sensitivity of the range sensor 113 in an area where an obstacle is likely to exist.

As described above, according to the present embodiment, when an obstacle such as a hole or a step is likely to continue, the traveling device 1 recognizes the obstacle as a continuous obstacle so as to travel safely without colliding with the obstacle.

The traveling device 1 of the present embodiment provides a secondary effect that detecting a ditch or a curb on the roadside on the road surface enables traveling control to keep a distance from the roadside constant.

Although the present embodiment is described heretofore, the specific configuration of each apparatus or unit, the specific content of processing, etc., are not limited to the above description. In the above-described embodiment, the predetermined radius, the predetermined range, the predetermined number of feature values, the predetermined time or distance, the predetermined depth and the predetermined length of the obstacle, and the like can be stored in a memory, for example, by a manufacturer based on empirical data or set by a user.

Aspects of the present disclosure are, for example, as follows.

Aspect 1 concerns a traveling body that travels on a road surface based on an obstacle map in a traveling region. The traveling body includes a range sensor disposed on a front face of the traveling body in a traveling direction in which the traveling body travels. The range sensor is disposed obliquely downward at a predetermined inclination angle relative to the road surface. The traveling body further includes a determination unit configured to determine presence of a continuous obstacle in a case where measurement results of a plurality of planes scanned by the range sensor include a plurality of feature values indicating unevenness relative to the road surface similar to each other; and a map generation unit configured to generate an obstacle map of a front region of the traveling body not scanned by the range sensor, based on sequential feature information indicating that a predetermined number of feature values indicating the unevenness are sequentially present.

In Aspect 2, in the traveling body according to Aspect 1, in a case where the plurality of feature values indicating the unevenness are sequentially present for a predetermined length, the determination unit determines that another feature value relating the unevenness continues for the predetermined length.

In Aspect 3, in the traveling body according to Aspect 1 or 2, the map generation unit performs curve fitting prediction to generate the obstacle map of the front region of the traveling body.

In Aspect 4, the traveling body according to any one of Aspects 1 to 3 further includes a tilt sensor configured to detect a tilt amount of the traveling body, and the determination unit corrects a height difference relative to the road surface measured by the range sensor, based on the tilt amount.

In Aspect 5, in the traveling body according to any one of Aspects 1 to 4, the predetermined inclination angle of the range sensor relative to the road surface is 35 degrees or greater relative to a horizontal direction, and the sensor is installed at such a height that the range sensor detects 1 m or more ahead of a front end of a driver traveling on the road surface in the traveling direction.

In Aspect 6, in the traveling body according to Aspect 1, the range sensor is a two-dimensional light detection and ranging sensor capable of range finding in a two-dimensional direction.

In Aspect 7, in the traveling body according to Aspect 1, the range sensor is a three-dimensional light detection and ranging sensor capable of range finding in a three-dimensional direction.

Aspect 8 concerns a computer program for controlling a computer system that controls a traveling body including a range sensor disposed on a front face of the traveling body in a traveling direction in which the traveling body travels. The range sensor is disposed obliquely downward at a predetermined inclination angle relative to a road surface, and the traveling body is controlled to travel based on an obstacle map in a travel region. The computer program controls the computer system to determine presence of a continuous obstacle in a case where measurement results of a plurality of planes scanned by the range sensor include a plurality of feature values indicating unevenness relative to the road surface similar to each other; and generate an obstacle map of a front region of the traveling body not scanned by the range sensor, based on sequential feature information indicating that a predetermined number of feature values indicating the unevenness are sequentially present.

Another aspect concerns a traveling body that travels on a road surface based on an obstacle map in a traveling region. The traveling body includes a range sensor, a determination unit, and a map generation unit. The range sensor is disposed on a front face of the traveling body in a traveling direction of the traveling body and disposed obliquely downward at a predetermined inclination angle relative to the road surface. The determination unit determines presence of a continuous obstacle in a case where at least one of a plurality of measurement results by the range sensor includes a feature value indicating unevenness relative to the road surface and a plurality of measurement results by the range sensor includes a plurality of feature values indicating similar unevenness relative to the road surface. The map generation unit generates an obstacle map of a front region of the traveling body not scanned by the range sensor, based on sequential feature information indicating that a predetermined number of feature values indicating the unevenness are sequentially present.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device, or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cash memory of the CPU, and the RAM may function as a physical memory or a primary memory of the apparatus, while the HDD may function as a secondary memory of the apparatus.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A traveling body, comprising:
   a range sensor disposed on a front face of the traveling body in a traveling direction in which the traveling body travels on a road surface, the range sensor being disposed obliquely downward at an inclination angle relative to the road surface; and
   circuitry configured to:
   control the range sensor to scan a plurality of planes;
   detect a plane of the road surface;
   determine presence of a continuous obstacle in a case that plural sequential measurement results of scanning by the range sensor include feature values indicating an object height above the plane of the road surface, the feature values being within a threshold value of each other;
   determine presence of a continuous recess in a case that the plural sequential measurement results of the scanning by the range sensor include feature values indicating an object height below the plane of the road surface;
   generate a map of a front region, in front of the traveling body in the traveling direction and which is not scanned by the range sensor, based on sequential feature information generated based on determination of presence of the continuous obstacle and determination of presence of the continuous recess; and control the traveling body to travel on the road surface based on the map.

2. The traveling body according to claim 1, wherein in a case that the feature values are sequentially present for a predetermined length, the circuitry determines that another feature value continues for the predetermined length.

3. The traveling body according to claim 1, wherein the circuitry performs curve fitting prediction to generate the map of the front region of the traveling body.

4. The traveling body according to claim 1, further comprising:

a tilt sensor configured to detect a tilt amount of the traveling body, wherein the circuitry is configured to correct, based on the tilt amount, a height difference relative to the road surface measured by the range sensor.

5. The traveling body according to claim 1, further comprising:

a driver configured to travel on the road surface, wherein the inclination angle of the range sensor relative to the road surface is 35 degrees or greater relative to a horizontal direction, and the range sensor is installed at a height such that the range sensor detects 1 meter or more ahead of a front end of the driver in the traveling direction.

6. The traveling body according to claim 1, wherein the range sensor is configured to perform range finding in a two-dimensional space in front of the traveling body.

7. The traveling body according to claim 1, wherein the range sensor is configured to perform range finding in a three-dimensional space in front of the traveling body.

8. The traveling body according to claim 1, wherein the obstacle is a curb.

9. A non-transitory recording medium storing a plurality of program codes which, when executed by one or more processors, causes the one or more processors to perform a method for controlling a traveling body, the method comprising:

controlling a range sensor to scan a plurality of planes, the range sensor disposed on a front face of the traveling body in a traveling direction in which the traveling body travels on a road surface, the range sensor being disposed obliquely downward at an inclination angle relative to the road surface;

detecting a plane of the road surface;

determining presence of a continuous obstacle in a case that plural sequential measurement results of scanning by a range sensor include feature values indicating an object height above the plane of the road surface, the feature values being within a threshold value of each other;

determining presence of a continuous recess in a case that the plural sequential measurement results of the scanning by the range sensor include feature values indicating an object height below the plane of the road surface;

generating a map of a front region, in front of the traveling body in the traveling direction and which is not scanned by the range sensor, based on sequential feature information generated based on determination of presence of the continuous obstacle and determination of presence of the continuous recess; and controlling the traveling body to travel on the road surface based on the map.

\* \* \* \* \*